US009018822B2

(12) United States Patent
Okimitsu et al.

(10) Patent No.: US 9,018,822 B2
(45) Date of Patent: Apr. 28, 2015

(54) STATOR FOR ROTARY ELECTRIC MACHINE

(75) Inventors: Takeomi Okimitsu, Saitama (JP);
Koichi Oku, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 585 days.

(21) Appl. No.: 13/414,155

(22) Filed: Mar. 7, 2012

(65) Prior Publication Data

US 2012/0228989 A1 Sep. 13, 2012

(30) Foreign Application Priority Data

Mar. 8, 2011 (JP) .................................. 2011-050186
Mar. 8, 2011 (JP) .................................. 2011-050187
Mar. 8, 2011 (JP) .................................. 2011-050188

(51) Int. Cl.
*H02K 3/50* (2006.01)
*H02K 3/38* (2006.01)
*H02K 3/12* (2006.01)

(52) U.S. Cl.
CPC ........................................ *H02K 3/12* (2013.01)

(58) Field of Classification Search
USPC .................................... 310/201–208, 160, 71
See application file for complete search history.

(56) References Cited

U.S. PATENT DOCUMENTS 6,147,432 A * 11/2000 Kusase et al. ................. 310/260
6,252,327 B1 * 6/2001 Matsuzaki ..................... 310/201
6,548,933 B2 * 4/2003 Yasuhara et al. ............. 310/203

FOREIGN PATENT DOCUMENTS

| JP | 08-205441 A | 8/1996 |
| JP | 2002-078261 A | 3/2002 |
| JP | 2007-259555 A | 10/2007 |
| JP | 2010-239798 A | 10/2010 |
| JP | 2011-036009 A | 2/2011 |

OTHER PUBLICATIONS

Reasons for Rejection dated Nov. 4, 2014 corresponding to Japanese Patent Application No. 2011-050186.
Reasons for Rejection dated Nov. 4, 2014 corresponding to Japanese Patent Application No. 2011-050187.
Reasons for Rejection dated Nov. 4, 2014 corresponding to Japanese Patent Application No. 2011-050188.

* cited by examiner

*Primary Examiner* — Dang Le
(74) *Attorney, Agent, or Firm* — Squire Patton Boggs (US) LLP

(57) ABSTRACT

A stator for a rotary electric machine includes: a stator core in a cylindrical shape with plural slots formed at an inner circumferential surface; plural coil segments inserted in the slots from one end surface side of the stator core; and plural coil end plates electrically connected with the coil segments on another end surface side of the stator core, wherein the coil segments respectively include: one leg portion; another leg portion; and a curved portion that is continuously formed between the one leg portion and the other leg portion, wherein the coil end plates respectively include: a plate portion in a flat plate shape; and a pair of extended portions, and wherein end portions of the leg portions of the coil segments are connected to the extended portions. It is possible to improve assembly and attain downsizing by reducing the volume of coil end portions for the stator.

18 Claims, 19 Drawing Sheets

ONE END SURFACE SIDE
↑
↓
OTHER END SURFACE SIDE

ONE END SURFACE SIDE

OTHER END SURFACE SIDE

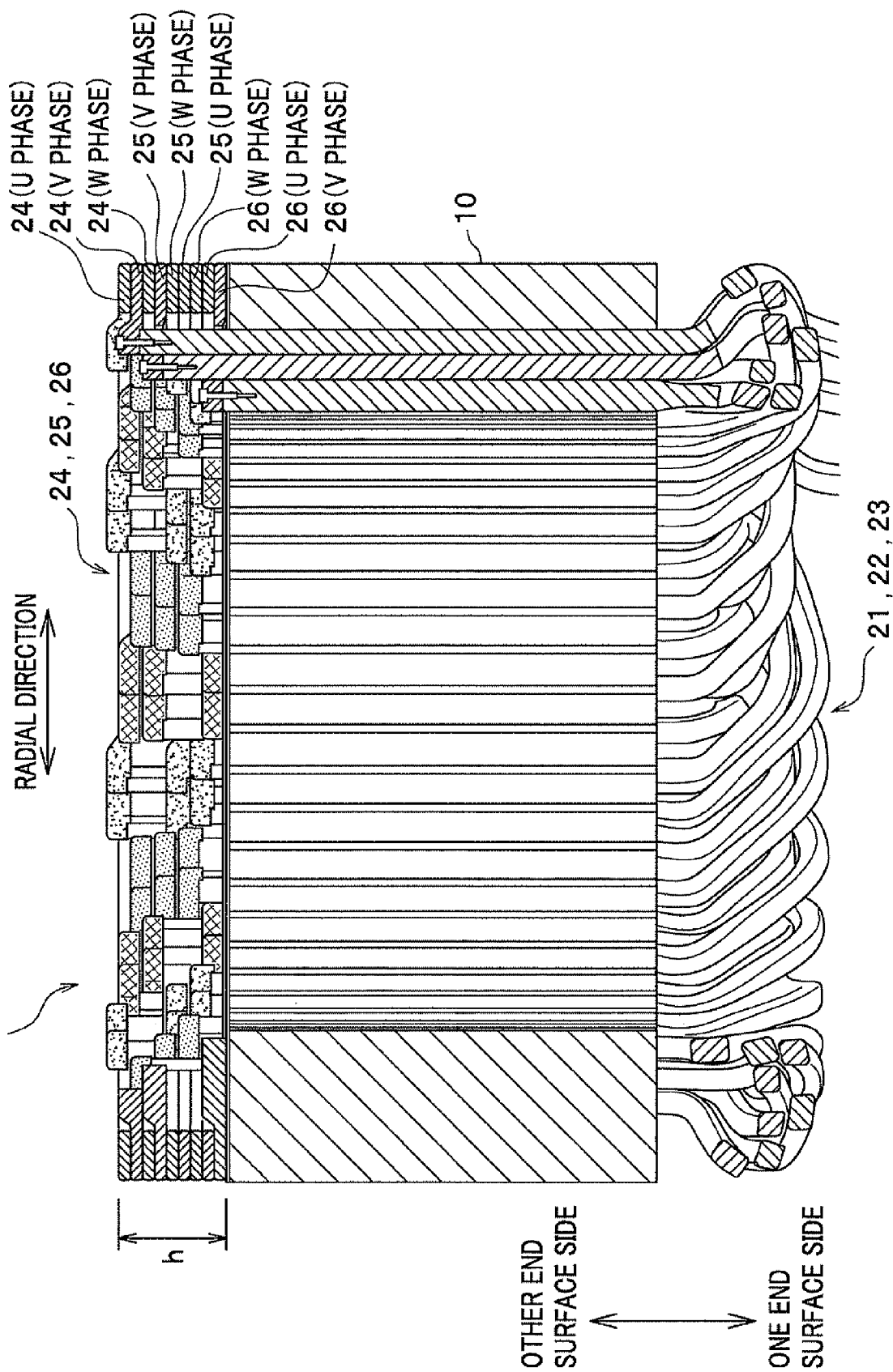

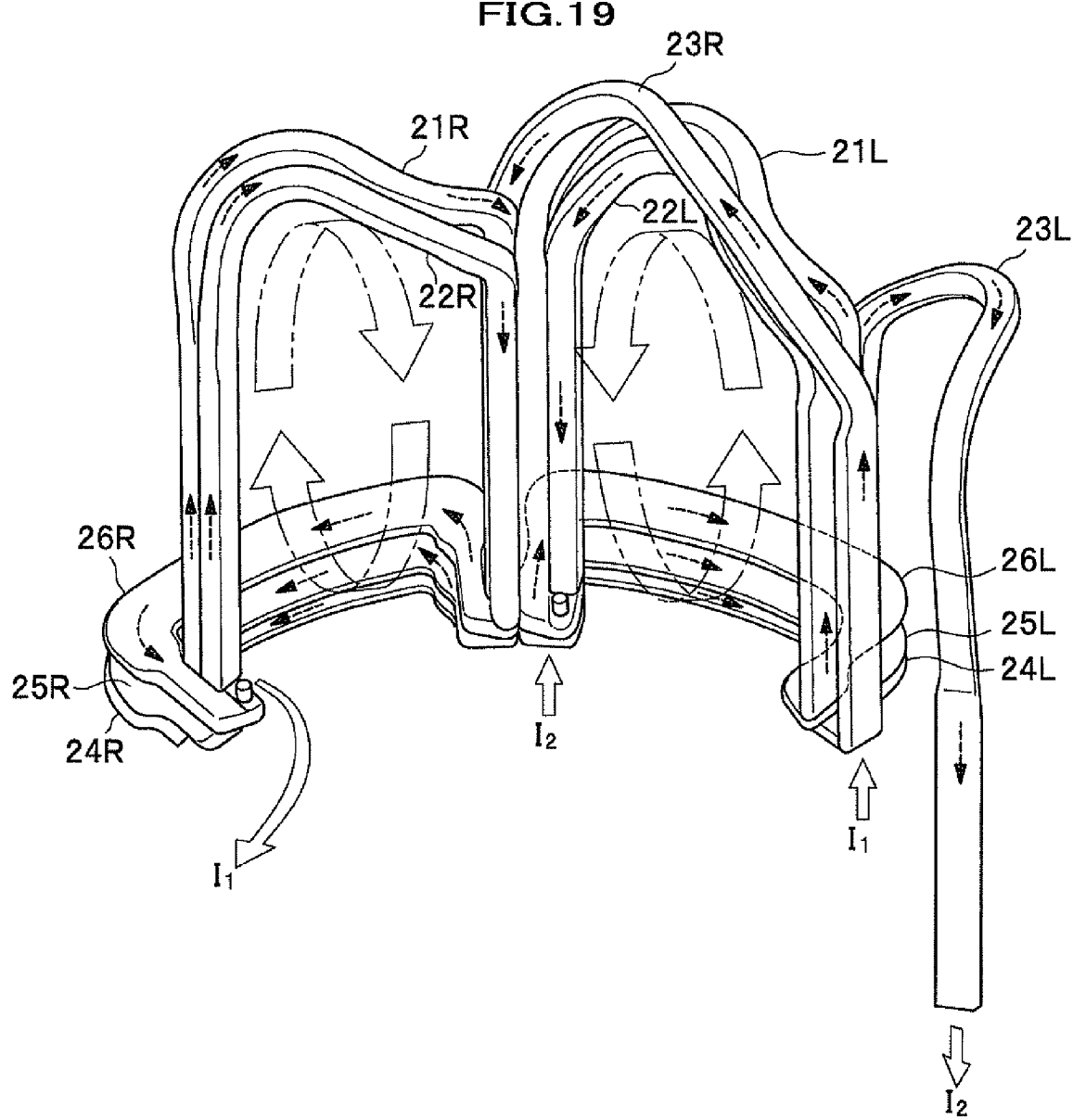

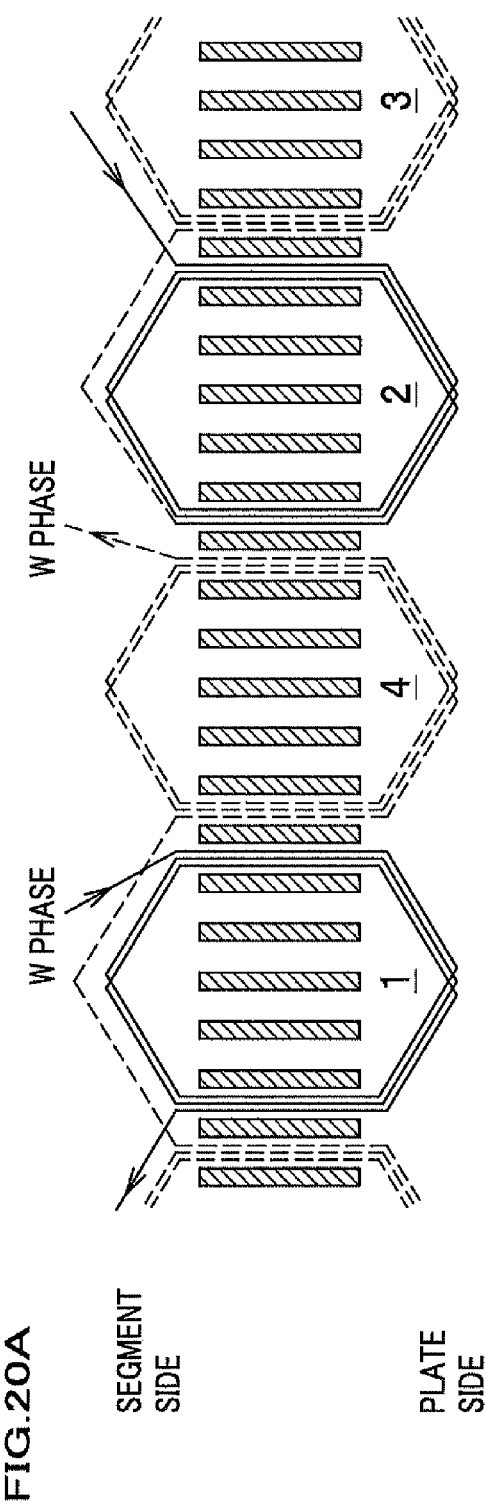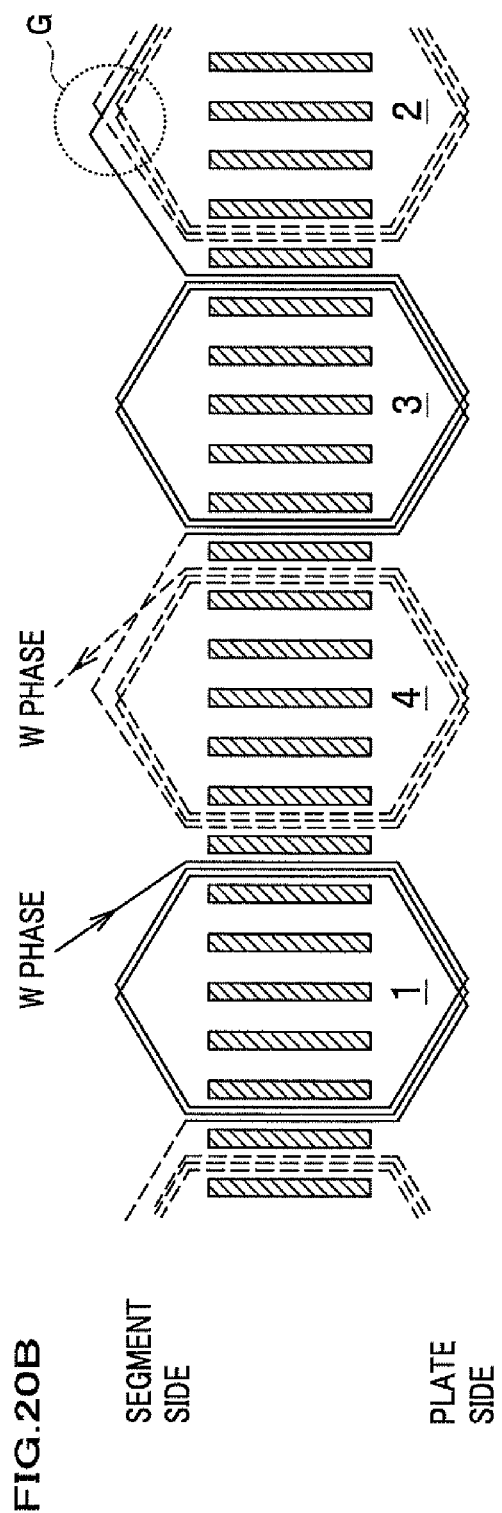

ROTATIONAL AXIS X DIRECTION

STATOR FOR ROTARY ELECTRIC MACHINE

CROSS REFERENCE TO RELATED APPLICATIONS

This application claims the priorities of Japanese Applications Nos. 2011-050186, 2011-050187, and 2011-050188, filed on Mar. 8, 2011, the entire specification, claims and drawings of which are incorporated herewith by reference.

BACKGROUND OF THE INVENTION

1. Field of the Invention

The present invention relates to a stator used for a rotary electric machine, such as an electric motor, a generator, or the like.

2. Description of the Related Art

Conventionally, various structures have been presented for a stator, having a stator core, a stator coil, and the like for a rotary electric machine. For example, a stator is presented, in Patent Document 1 (Japanese Patent Application Laid-open No. 2007-259555 A), that includes an iron core with a plurality of slots, coil end plate laminations, each of which is a plurality of coil end plates laminated along the radial direction and inserted in the slots, and crossover members for connection between the coil end plate laminations inserted in different slots.

However, the stator presented by Patent Document 1 has portions that require physical connections, causing a problem of low assembly. Further, the crossover members of the stator presented in Patent Document 1 are extending along the rotation axis direction of a rotary electric machine, which causes a problem that the volume of the coil end portions is large and downsizing is not easy.

SUMMARY OF THE INVENTION

The present invention has been developed addressing such problems, and an object of the invention is to provide a stator for a rotary electric machine, wherein assembly is improved and downsizing is attained by reducing the volume of coil end portions.

In order to solve such problems, a stator for a rotary electric machine according to the present invention includes: a stator core in a cylindrical shape with a plurality of slots formed at an inner circumferential surface; a plurality of coil segments inserted in the slots from one end surface side of the stator core; and a plurality of coil end plates electrically connected with the coil segments on another end surface side of the stator core, wherein the coil segments respectively include: one leg portion received in one of the slots; another leg portion received in one of the slots that is different from the slot for the one leg portion; and a curved portion that is continuously formed between the one leg portion and the other leg portion and is exposed on the one end surface side of the stator core, wherein the coil end plates respectively include: a plate portion in a flat plate shape extended along a circumferential direction of the stator core; and a pair of extended portions respectively extended along a radial direction of the stator core from one end side of the plate portion, and wherein end portions of the leg portions of the coil segments are connected to the extended portions of the coil end plates.

For a stator for a rotary electric machine, the stator having such a structure, by receiving a plurality of coil segments in the slots of a stator core and electrically connecting the end portions of the plurality of coil segments with each other through coil end plates in a plate shape, it is possible to easily form coil loops around the rotation axis of the rotary electric machine, without extending coil end portions along the rotation axis.

The stator according to the invention for a rotary electric machine is preferably arranged such that the coil segments and the coil end plates are formed with the same cross-sectional area that is perpendicular to a direction of current flow.

For the stator for a rotary electric machine, the stator having such a structure, the electrical resistance of a stator coil can be made uniform. It is thereby possible to reduce local generation of heat, stabilize current flow, and stably form a rotational magnetic field.

The stator according to the invention for a rotary electric machine is preferably arranged such that the extended portions of the respective coil end plates include: a pair of first extended portions respectively extended along the radial direction of the stator core from the one end side of the plate portion; a pair of second extended portions respectively extended along the circumferential direction of the stator core from one end side of the first extended portions, wherein the end portions of the leg portions of the coil segments are connected to the second extended portions of the extended portions of the coil end plates.

The stator for a rotary electric machine, the stator having such a structure, the extension direction of the paired first extended portions of a coil end plate and the extension direction of the paired second extended portions are perpendicular to each other. Accordingly, when a plurality of coil end plates are lapped along the rotation axis direction of the rotary electric machine, the second extended portions of a coil end plate do not overlap with the first extended portions of another coil end plate. Thus, for the stator for a rotary electric machine, a high area occupation ratio of coils can be attained by using coil segments, the volume of crossover portions of coils on the other end surface of the state core can be reduced by using coil end plates, and further, a space for fastening by fastening members can be ensured in laminating the coil end plates.

The stator according to the invention for a rotary electric machine is preferably arranged such that the extended portions of the coil end plates are formed to be different in length between the coil end plates, corresponding to a number turns of a coil loop.

For the stator for a rotary electric machine, the stator having such a structure, coil end plates which are different in length of extended portions are used in a number that is the same as the number of coil turns (the number of turns of a coil loop). In such a manner, regardless of the number of coil turns, the extended portions (the second extended portions) of a coil end plate do not overlap with the extended portions of another coil end plate. Thus, a high area occupation ratio of coils can be attained by using coil segments, the volume of crossover portions of coils on the other end surface of the state core can be reduced by using coil end plates, and further, a space for fastening by fastening members can be ensured in laminating the coil end plates.

The stator according to the invention for a rotary electric machine is preferably arranged such that the second extended portions of each of the coil end plates are extended from the one end side of the first extended portions in the same direction that is the circumferential direction of the stator core.

For the stator for a rotary electric machine, the stator having such a structure, the extension directions of the paired second extended portions of a coil end plate are the same as each other. Accordingly, when a plurality of coil end plates are lapped along the rotation axis direction of the rotary electric machine, the second extended portions of a coil end plate do not overlap with the second extended portions of another coil end plate. Thus, a high area occupation ratio of coils can be attained by using coil segments, the volume of crossover portions of coils on the other end surface of the state core can be reduced by using coil end plates, and further, a space for fastening by fastening members can be ensured in laminating the coil end plates. Still further, the coil end plates can be laminated with regularity by extending the second extended portions of a coil end plate in the same direction.

The stator according to the invention for a rotary electric machine is preferably arranged such that length of the one or the other leg portion is different between the coil segments, corresponding to a phase of flowing current.

For the stator for a rotary electric machine, the stator having such a structure, in a case that currents are supplied from outside in a plurality of phases, the number of coil end plates laminated on the other end surface side of the stator core increases, corresponding to the number of phases of the currents. Further, even in a case that the distance between a coil segment and a coil end plate increases, the stator core being therebetween, the length of leg portions of the coil segment can be adjusted, corresponding to the increased distance. For the stator for a rotary electric machine, it is thereby possible to easily connect coil end plates and coil segments disposed on respective layers.

The stator according to the invention for a rotary electric machine is preferably arranged such that each of the slots of the stator core is formed such that a width of the slot increases as approaching an outer diameter side of the stator core.

The stator for a rotary electric machine, the stator having such a structure, can surely hold the coil segments received in the slots.

The stator according to the invention for a rotary electric machine is preferably arranged such that the leg portions of the coil segments are received in the slots of the stator core, in a plural number along a radial direction of the stator core, the plural number corresponding to a number of turns of a coil loop, wherein the closer to an outer diameter side of the stator core a leg portion is received, the larger a width of the leg portion is, corresponding to a shape of the slots.

The stator for a rotary electric machine, the stator having such a structure, the cross-sectional shape of a slot and the cross-sectional shape of a combination of a plurality of coil segments received in the slot in a certain order can be made the same, and the cross-sections have a tapered shape whose width becomes larger as moving from the inner diameter toward the outer diameter. It is thereby possible to hold coil segments more surely, compared with a case of a cross-section with a uniform width.

The stator according to the invention for a rotary electric machine is preferably arranged such that a thickness of the extended portions of the coil end plates is larger than a thickness of the plate portion.

For the stator for a rotary electric machine, the stator having such a structure, even in a case of forming thin coil end plates, the cross-sectional resistance value of members forming a coil loop can be made uniform.

In order to solve such problems, a stator for a rotary electric machine according to the present invention includes: a stator core in a cylindrical shape with a plurality of slots formed at an inner circumferential surface; a plurality of coil segments inserted in the slots from one end surface side of the stator core; and a plurality of coil end plates electrically connected with the coil segments on another end surface side of the stator core, wherein the coil segments respectively include: one leg portion received in one of the slots; another leg portion received in one of the slots that is different from the slot for the one leg portion; and a curved portion that is continuously formed between the one leg portion and the other leg portion and is exposed on the one end surface side of the stator core, wherein the coil end plates respectively include: a plate portion in a flat plate shape extended along a circumferential direction of the stator core; and a pair of extended portions respectively extended along a radial direction of the stator core from one end side of the plate portion, wherein end portions of the leg portions of the coil segments are connected to the extended portions of the coil end plates, and wherein the coil end plates are disposed in a plural number along the circumferential direction of the stator core and laminated, on the other end surface of the stator core, such that the extended portions are shifted along the radial direction of the stator core, corresponding to a layer of the lamination.

For a stator for a rotary electric machine, the stator having such a structure, by receiving a plurality of coil segments in the slots of the stator core and electrically connecting the end portions of the plurality of coil segments with each other through coil end plates in a plate shape, it is possible to easily form coil loops around the rotation axis of the rotary electric machine, without extending coil end portions along the rotation axis of the rotary electric machine.

Further, the coil end plates of the stator for a rotary electric machine are arranged such that the pairs of extended portions thereof are shifted along the radial direction of the stator core, corresponding to the respective layers, and accordingly, the extended portions of a coil end plate do not overlap with the extended portions of another coil end plate. Thus, a high area occupation ratio of coils can be attained by using coil segments, the volume of crossover portions of coils on the other end surface of the state core can be reduced by using coil end plates, and further, a space for fastening by fastening members can be ensured in laminating the coil end plates.

The stator according to the invention for a rotary electric machine is preferably arranged such that the coil end plates form virtual circles by being disposed in a circular annular form such that each of the coil end plates has no portion that overlaps with a neighboring coil end plate on the same layer; on the lower layer a coil end plate is arranged, the longer along the radial direction of the stator core the extended portions of the coil end plate are formed, and wherein the virtual circles are formed such that on the lower layer a virtual circle is, the smaller radius the virtual circle has.

For the stator for a rotary electric machine, the stator having such a structure, in a state that the pairs of extended portions of coil end plates are exposed, the coil end plates can be laminated on the other end surface of the stator core. Thus, a high area occupation ratio of coils can be attained by using coil segments, the volume of crossover portions of coils on the other end surface of the state core can be reduced by using coil end plates, and further, a space for fastening by fastening members can be ensured in laminating the coil end plates.

The stator according to the invention for a rotary electric machine is preferably arranged such that the coil end plates form virtual circles by being disposed in a circular annular form such that each of the coil end plates has no portion that overlaps with a neighboring coil end plate on the same layer; on the lower layer a coil end plate is arranged, the shorter along the radial direction of the stator core the extended portions of the coil end plate are formed, and wherein the virtual circles are formed such that on the lower layer a virtual circle is, the larger radius the virtual circle has.

For the stator for a rotary electric machine, the stator having such a structure, in a state that the pairs of extended portions of the coil end plates are exposed, the coil end plates can be laminated on the other end surface of the stator core.

Thus, a high area occupation ratio of coils can be attained by using coil segments, the volume of crossover portions of coils on the other end surface of the state core can be reduced by using coil end plates, and further, a space for fastening by fastening members can be ensured in laminating the coil end plates.

The stator according to the invention for a rotary electric machine is preferably arranged such that wherein each pair of the extended portions includes: a pair of first extended portions that are respectively extended along the radial direction of the stator core from the one end side of the plate portion; and a pair of second extended portions that are respectively extended along the circumferential direction of the stator core from one end side of the first extended portions, wherein the end portions of the leg portions of the coil segments are connected to the second extended portions of the extended portions of the coil end plates, wherein the plate portions are disposed such as to overlap with each other at the same position, along a rotational axis direction of the rotary electric machine, correspondingly to a phase of a flowing current, wherein the first extended portions are disposed such as to partially overlap with each other along the rotational axis direction, correspondingly to a phase of a flowing current, and wherein the second extended portions are disposed such as not to overlap with each other along the rotational axis direction.

For the stator for a rotary electric machine, the stator having such a structure, the extending direction of the paired first extended portions and the extended direction of the paired second extended portions of each coil end plate are perpendicular to each other, and when a plurality of coil end plates are lapped along the rotation axis direction of the rotary electric machine, the second extended portions of the coil end plates do not overlap with each other. Accordingly, in laminating coil end plates on the other end surface of the stator core, a wider space for fastening by fastening members can be ensured.

In order to solve such problems, a stator for a rotary electric machine according to the present invention includes: a stator core in a cylindrical shape with a plurality of slots formed at an inner circumferential surface; a plurality of coil segments inserted in the slots from one end surface side of the stator core; and a plurality of coil end plates electrically connected with the coil segments on another end surface side of the stator core, wherein the coil segments respectively include: one leg portion received in one of the slots; another leg portion received in one of the slots that is different from the slot for the one leg portion; and a curved portion that is continuously formed between the one leg portion and the other leg portion and is exposed on the one end surface side of the stator core, wherein the paired leg portions of the coil segment are received in two slots of the stator core, and respective end portions of the paired leg portions of the coil segment received in the two slots are connected with respective different coil end plates on the other end surface side of the stator core, to thereby form a circular annular current path, wherein the current path is formed in a plural number along a radial direction of the stator core, corresponding to a number of combinations of coil segments inserted in the same slot of the stator core and corresponding coil end plates, and in a plural number along a circumferential direction of the stator core, corresponding to a number of combinations of coil segments inserted in different slots of the stator core and corresponding coil end plates, and wherein, in current paths neighboring along the circumferential direction of the stator core out of the plural current paths formed along the radial direction and the circumferential direction of the stator core, currents flow in respective rotation directions that are reverse to each other.

For a stator for a rotary electric machine, the stator having such a structure, by receiving a plurality of coil segments in the slots of the stator core and electrically connecting the end portions of the plurality of coil segments with each other through coil end plates in a plate shape, it is possible to easily form coil loops (current paths) around the rotation axis of the rotary electric machine, without extending coil end portions along the rotation axis of the rotary electric machine.

The stator according to the invention for a rotary electric machine is preferably arranged such that the coil end plates respectively include: a plate portion in a flat plate shape extended along a circumferential direction of the stator core; and a pair of extended portions respectively extended along a radial direction of the stator core from one end side of the plate portion, and wherein end portions of the leg portions of the coil segments are connected to the extended portions.

For the stator for a rotary electric machine, the stator having such a structure, coil end plates in a plate shape are used as coil end members, and it is thereby possible to minimize the height of the coil end portions.

The stator according to the invention for a rotary electric machine is preferably arranged such that the current paths are formed such as not to intersect, along the circumferential direction of the stator core, with neighboring current paths.

For the stator for a rotary electric machine, the stator having such a structure, generation of cross points due to intersection between neighboring coil turns (current paths) can be reduced, and it is thereby possible to improve the area occupation ratio of coils.

The stator according to the invention for a rotary electric machine preferably includes: a left-right reverse coil segment that is inserted into two slots from the one end surface side of the stator core, and electrically connected with two coil end plates on the other end surface side of the stator core so as to reverse a direction of a current flowing in coil segments, wherein the left-right reverse coil segment includes: one leg portion that is received by one of the two slots and connected with an extended portion of one of the two coil end plates; another leg portion that is received by the other one of the two slots that is different from the slot for the one leg portion, wherein an end portion of the other leg portion is connected with an extended portion of the other one of the two coil end plates; and a curved portion that is continuously formed between the one leg portion and the other leg portion and exposed on the one end surface side of the stator core.

For the stator for a rotary electric machine, the stator having such a structure, by providing a left-right reverse coil segment, it is possible to reverse the direction of a current flowing in coil segments, in other words, the direction of a coil loop.

The stator according to the invention for a rotary electric machine is preferably includes: a power supply coil segment for supplying power from an external power source to the coil segments and the left-right reverse coil segment, wherein the power supply coil segment includes: one leg portion that is received in a slot, one end portion thereof being connected with an extended portion of a coil end plate and another end portion thereof being exposed on the one end surface side of the stator core; another leg portion that is exposed on the one end surface side of the stator core, one end portion thereof being connected with the external power source; and a curved portion that is exposed on the one end surface side of the stator core and connects the other end portion of the one leg portion and another end portion of the other leg portion.

For the stator for a rotary electric machine, the stator having such a structure, by providing power supply coil segments, currents in an arbitrary number of phases can be supplied from outside.

The stator according to the invention for a rotary electric machine preferably includes: a midpoint-short-circuit coil end plate that is electrically connected, on the one end surface side of the stator core, with coil end plates each of which forms the last current path of the plural current paths in a group formed on the stator, wherein the midpoint-short-circuit coil end plate short circuits currents in plural phases supplied from outside at a midpoint; and midpoint-connection coil segments for electrically connecting the midpoint-short-circuit coil end plate and the coil end plates, wherein the midpoint-short-circuit coil end plate includes: a plate portion in a flat plate shape extending along the circumferential direction of the stator core; and extended portions that are respectively extended along the radial direction of the stator core from one end side of the plate portion, a number of the extended portions being corresponding to a number of phases of currents, one end portion of each midpoint-connection coil segment being connected to a corresponding one of the extended portions, and wherein the midpoint-connection coil segments are received in slots, the other end portion of each midpoint-connection coil segment being connected with an extended portion of the corresponding coil end plate.

For the stator for a rotary electric machine, the stator having such a structure, by providing a midpoint-short-circuit coil end plate and midpoint-connection coil segments, currents in plural phases can be short-circuited.

The stator according to the invention for a rotary electric machine is preferably arranged such that the coil segments, the left-right reverse coil segments, the coil end plates, the power supply coil segments, the midpoint-short-circuit coil end plate, and the midpoint-connection coil segments are formed such as to have the same cross-sectional area perpendicular to a direction of current flow.

For the stator for a rotary electric machine, the stator having such a structure, a uniform electrical resistance of stator coils can be attained, and it is thereby possible to reduce local heat generation, stabilize currents, and stably form a rotational magnetic field.

For a stator for a rotary electric machine according to the present invention, coil loops are formed, based on rough categorization, by two kinds of members, which are coil segments, each of which is continuously formed in a U-shape, and coil end plates, it is thereby possible to minimize portions which require physical connection and improve the assembility. Further, as coil end plates in a plate shape are used as coil end members of the stator for a rotary electric machine, the height of the coil end portions on an end surface of a stator core can be reduced. Accordingly, even if rigid conductors are used for coil loops, the volume of the coil end portions can be reduced while satisfactory lap winding is carried out, and downsizing of a whole device can thereby be realized.

BRIEF DESCRIPTION OF THE DRAWINGS

FIGS. 5A and 5B are diagrams showing the structures of coil segments which are a part of the stator coil of the stator for a rotary electric machine, according to the embodiment, wherein FIG. 5A is a perspective view showing a state of lapping, along the radial direction of the stator core, the leg portions of three kinds of coil segments with different shapes, and FIG. 5B shows cross-sectional views taken along B-B, C-C, and D-D in FIG. 5A in the order from the left to the right;

FIGS. 9A and 9B are diagrams showing the structures of the coil end plates of the stator for a rotary electric machine, according to the embodiment, wherein FIG. 9A is a perspective view showing the whole structure of the stator of the rotary electric machine in a state that the side on which the coil end plates are arranged faces upward, and FIG. 9B is an enlarged cross-sectional view of part F in FIG. 9A;

FIGS. 10A to 10C are diagrams showing the structures of coil end plates which partially form the stator coil of the stator for a rotary electric machine, according to the embodiment, wherein FIGS. 10A, 10B, and 10C are perspective views showing coil end plates of three kinds with different shapes;

FIG. 11A and FIG. 11B are diagrams showing the structures of coil end plates which partially form the stator coil of the stator for a rotary electric machine, according to the embodiment, wherein FIG. 11A is a perspective view showing a state that the plate portions of three kinds of coil end plates having different shapes are going to be lapped along the rotation axis direction of the rotational electrical machine, and FIG. 11B is a plan view showing a state that the plate portions of the three kinds of coil end plates with different shapes are lapped;

FIG. 12 is a diagram showing the whole structure of the stator for a rotary electric machine, according to the embodiment, and is a side cross-sectional view in a state that the side on which the coil end plates are arranged faces upward;

FIG. 19 is a schematic view for illustration of coil turns of the stator for a rotary electric machine, according to the embodiment;

FIGS. 20A and 20B are schematic diagrams for illustration of a coil loop of a stator for a rotary electric machine, wherein FIG. 20A is a schematic diagram for illustration of a coil loop of the stator for a rotary electric machine, according to the embodiment, and FIG. 20B is a schematic view for illustration of a coil loop of a conventional stator for a rotary electric machine;

FIGS. 21A and 21B are diagrams showing the stator for a rotary electric machine, according to another embodiment, wherein FIG. 21A is a perspective view showing a state that three kinds of coil end plated with different shapes are going to be lapped along the rotation axis direction of the rotary electric machine such that the lower a layer is, a coil end plate with the shorter extended portions is disposed, and FIG. 21B is a perspective view showing a state that the three kinds of coil end plated with different shapes are lapped on the end surface of the stator core such that the lower a layer is, a coil end plate with the shorter extended portions is disposed.

DESCRIPTION OF PREFERRED EMBODIMENTS

A preferred embodiment of a stator according to the present invention (hereinafter, referred to merely as stator) for a rotary electric machine will be described below, referring to FIGS. 1 to 20. Dimensions and scales of structures shown in respective figures may be exaggerated for the convenience of description.

Figure 1:
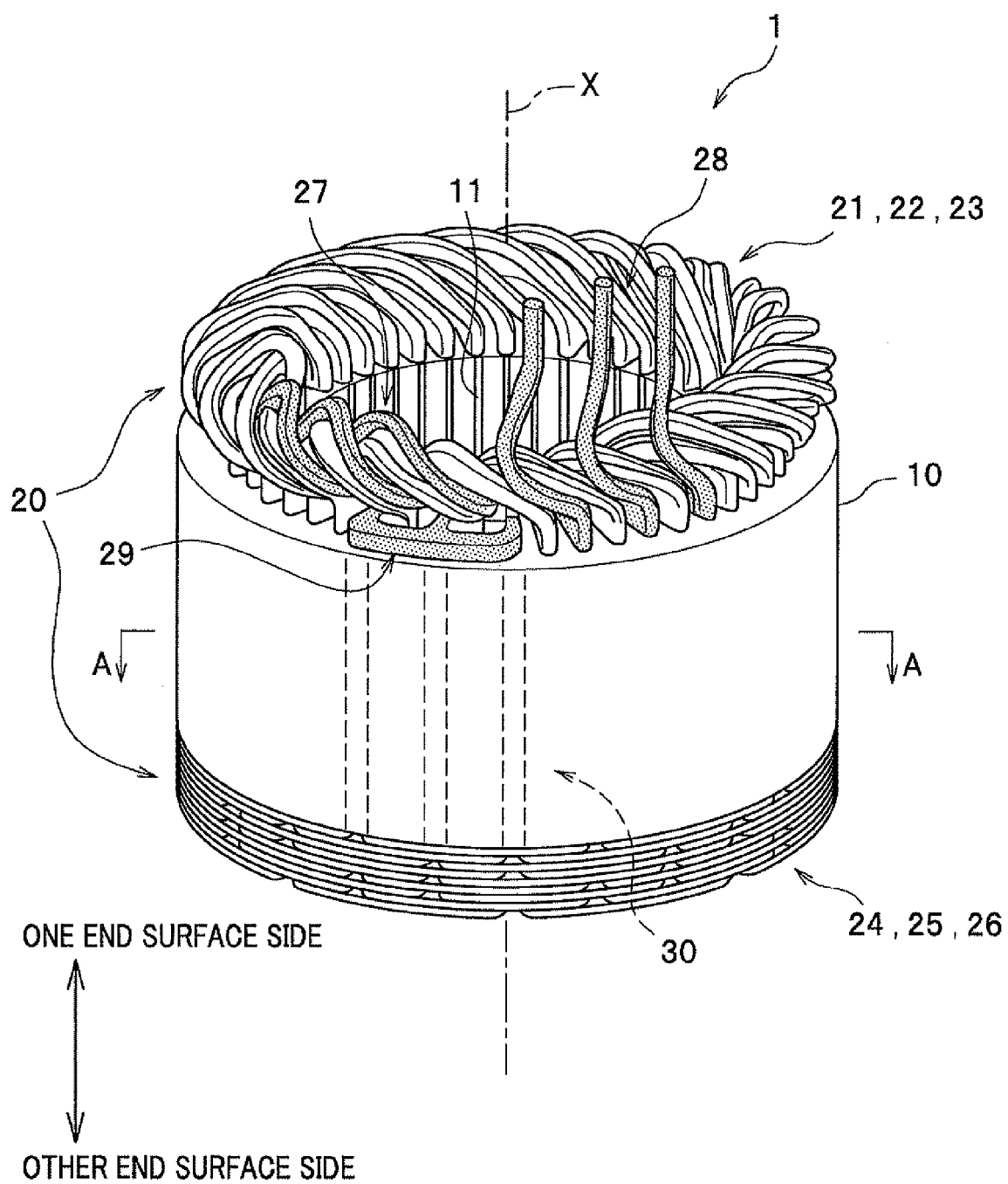
FIG. 1 is a perspective view showing the whole structure of a stator for a rotary electric machine, according to an embodiment.

A stator 1 is, as shown in FIG. 1, a stator for a rotary electric machine for rotational motion by conversion of electrical energy supplied from outside into mechanical energy. Electrical energy is input to the stator 1 from outside, and the stator 1 generates a magnetic field for rotational motion of a rotor provided with permanent magnets. As shown in FIG. 1, the stator 1 includes a stator core 10 and a stator coil 20. The stator 1 can also be used, for example, as a stator for an induction motor, a synchronous motor, or the like.

Figure 2:
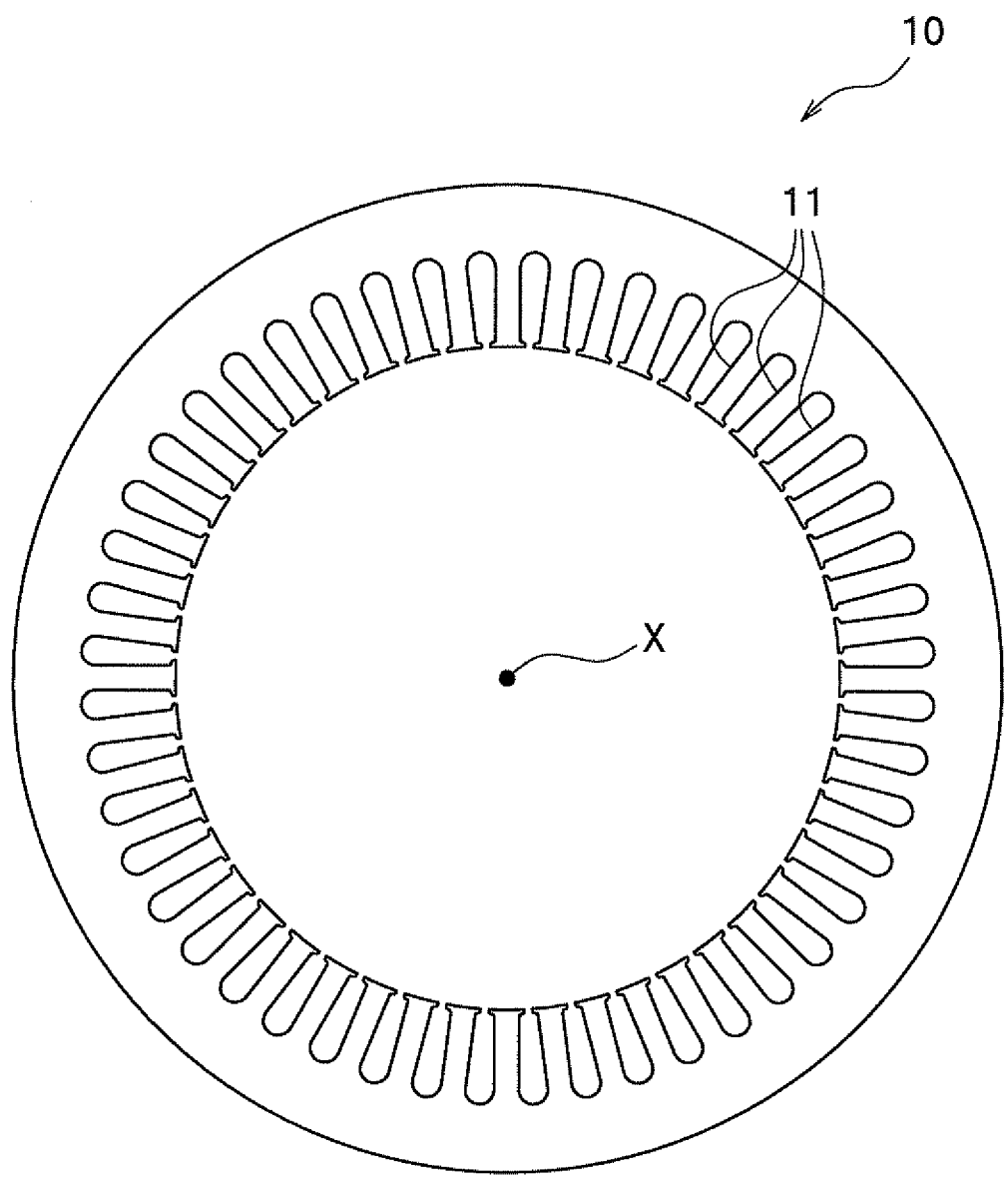
FIG. 2 is a plan view showing the structure of the stator core of the stator for a rotary electric machine, according to the embodiment.

The stator core 10 is, as shown in FIG. 1, a core member to which the stator coil 20 is attached. The stator core 10 is, as shown in FIG. 2, formed in a cylindrical shape and a rotor, not shown, is arranged inside the cylinder. The stator core 10 can be formed, for example, by lamination of thin electromagnetic steel plates in a circular annular shape along the rotation axis X direction of the rotary electric machine. As shown in FIG. 2, a plurality of slots 11 are formed at uniform intervals on the inner circumferential surface of the stator core 10.

As shown in FIG. 1, the slots 11 are arranged to receive coil segments. The slots 11 are, as shown in FIG. 1, formed linearly along the rotation axis X direction of the rotary electric machine. In a plan view, as shown in FIG. 2, the slots 11 are formed in the same largeness (the same cross-sectional area, in other words, the same largeness of cross-section) with respect to the rotation axis X direction such as to increase in the width as going toward the outer diameter side of the stator core 10. Thus, the stator 1 in the present embodiment can surely hold coil segments received in the slots 11. Herein, the slots 11 may also be formed with a width that is constant or uniform along the radial direction of the stator core 10.

Herein, as shown in FIG. 2, the slots 11 are formed in a number of 48 and in one row with respect to the rotation axis X direction. However, the number of the slots 11 is not particularly limited, and can be changed, as appropriate, corresponding to the number of coil turns (the number of turns of a coil loop) formed along the circumferential direction of the stator core 10 and the number of phases of currents supplied from outside. Coil turns formed in the stator 1 will be described later in detail (refer to FIG. 19 described later).

Figure 3:
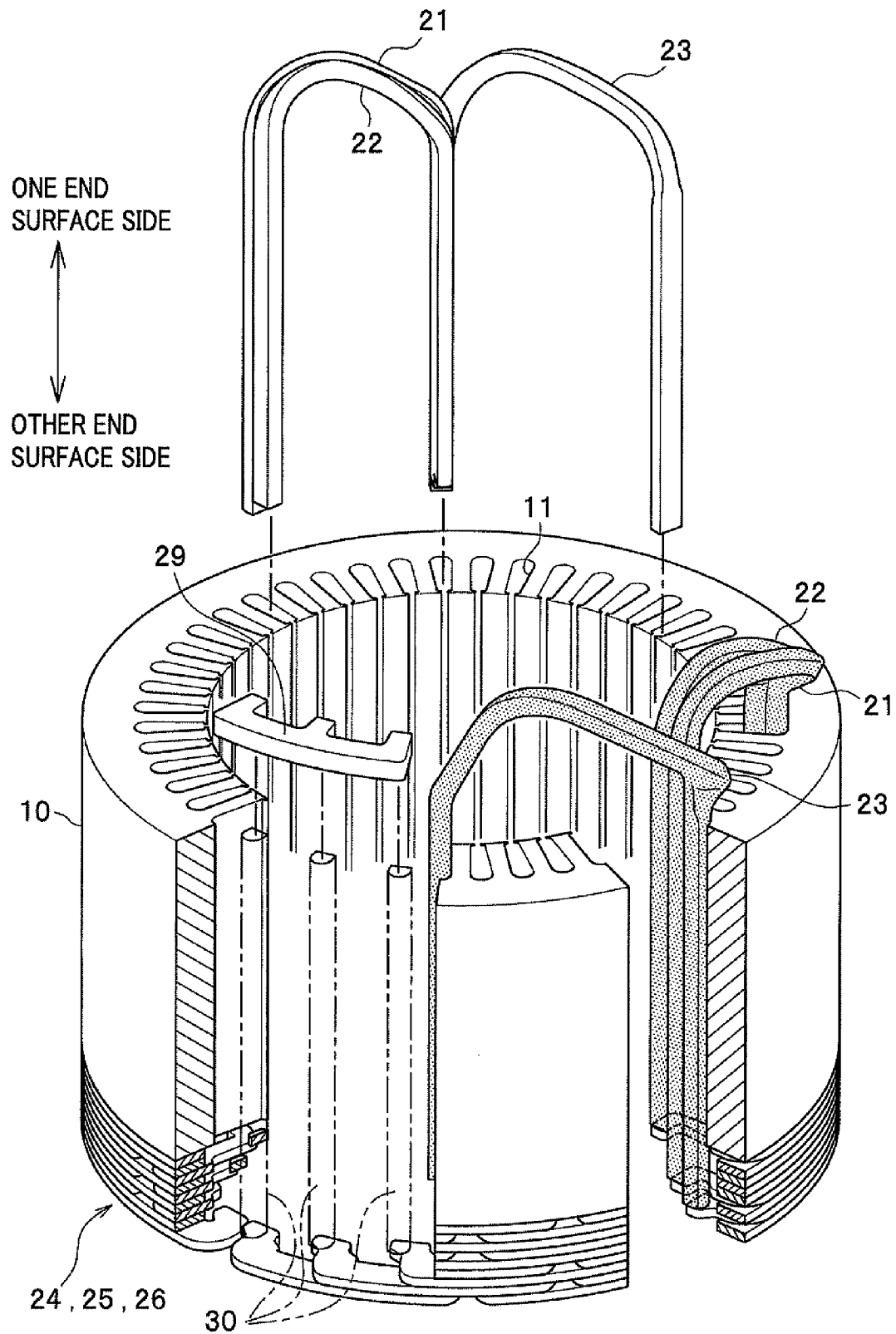
FIG. 3 is a diagram showing a state of connection between coil segments etc. and coil end plates of the stator for a rotary electric machine, according to the embodiment, wherein a part of the stator core is cut out.

As shown in FIG. 3, in the slots 11, coil segments (coil segments 21, 22, 23, left-right reverse coil segments 27, power supply coil segments 28, and midpoint connection coil segments 30) in plural kinds are inserted from one end surface side of the stator core 10. Further, as described later, the coil segments in the above-described plural kinds are received in the respective slots 11, in a plural number (herein three) and in a certain order along the radial direction of the stator core 10.

The stator coil 20 is, as shown in FIG. 1, magnetically excited by electrical energy that is input from outside to generate a rotational magnetic field. Herein, currents in three phases, namely, U-phase, V-phase, and W-phase are supplied from outside to the stator coil 20. Herein, as shown in FIG. 1, the stator coil 20 is not an ordinary winding wire but is constructed with coil segments in pieces of plural kinds and coil end plates in plural kinds.

For the stator 1 according to the present embodiment, coil turns are formed in a plural number along the radial direction and the circumferential direction of the stator core 10 by coil segments in plural kinds and coil end plates in plural kinds. Herein, a coil turn refers to an annular current path which is formed such that a coil segment is received by two slots 11 of the stator core 10 and the end portions, received in the two slots, of the coil segment are electrically connected with respective different coil end plates on the end surface side of the stator core 10 (refer to FIG. 19 described later). A coil loop refers to a current path formed by all coil turns in a group and is arranged over the whole stator 1 (a current path around the rotation axis X of the rotary electric machine) (refer to FIG. 20 described later). In the description below, first, the respective elements of the stator 1 will be described, and then, coil turns and coil loops formed for the stator 1 will be described.

The coil segments in the plural kinds include, as shown concretely in FIG. 1, the coil segments 21, 22, 23, the left-right reverse coil segments 27, the power supply coil segments 28, and the midpoint connection segments 30. The coil end plates in the plural kinds include, as shown concretely in FIG. 1, the coil end plate 24, 25, 26, and a midpoint-short-circuit coil end plate 29. For the stator coil 20, as shown in FIG. 1, one electrical a loop is formed in such a manner that such coil segments in plural kinds and coil end plates in plural kinds are electrically connected on the end surface side of the stator core 10.

The coil segments in plural kinds (the coil segments 21, 22, 23, the left-right reverse coil segments 27, the power supply coil segments 28, and the midpoint connection coil segments 30) and the coil end plates in plural kinds (the coil end plates 24, 25, 26 and the midpoint-short-circuit coil end plate 29) of the stator coil 20 are formed with the same cross-sectional area (the same largeness of cross-section) perpendicular to the direction of current flow. That is, for the stator 1 according to the present embodiment, the coil segments and the coil end plates constructing the stator coil 20 are designed such as to have the same cross-sectional area although the cross-sectional shapes are different, as described later. Thus, for the stator 1 according to the present embodiment, the electrical resistance of the stator coil 20 can be made uniform, and it is thereby possible to reduce generation of local heat, stabilize current flow, and stably form a rotational magnetic field.

Further, though not shown, coil segments in plural kinds (the coil segments 21, 22, 23, the left-right reverse coil segments 27, the power supply coil segments 28, and the midpoint connection coil segments 30) and the coil end plates in plural kinds (the coil end plates 24, 25, 26 and the midpoint-short-circuit coil end plate 29) for the stator coil 20 have been subjected to insulation processing, for example, by resin impregnation.

Structures of Coil Segments 21, 22, and 23

Coil segments 21, 22, 23 constructing a part of the stator coil 20 will be described below in detail. In the description below, in case of describing inclusively or abstractly the coil segments 21, 22, 23, and the coil end plates 24, 25, 26, they may be described respectively as 'coil segment' and 'coil end plate', reference symbols being omitted. Further, in the description below, in describing an element (for example, a pair of leg portions) common to the coil segments 21, 22, 23, an element common to coil end plates 24, 25, 26 (for example, a pair of extended portions), and the like, symbols for these common elements may be omitted to avoid reluctant description.

As shown in FIG. 1, the coil segments 21, 22, 23 are main coil elements of the stator coil 20, and are arranged to flow currents, which are supplied from outside, in the rotation axis X direction of the rotary electric machine and the circumferential direction of the stator core 10. The coil segments 21, 22, 23 are conductive members in a bar shape of, for example, copper, copper alloy, aluminum, aluminum alloy, or the like, and are in a shape that is bent substantially in a U-shape, as shown in FIG. 4. However, the material for coil segments 21, 22, 23 is not particularly limited as long as the material is excellent in conductivity and formability.

Figure 4A:
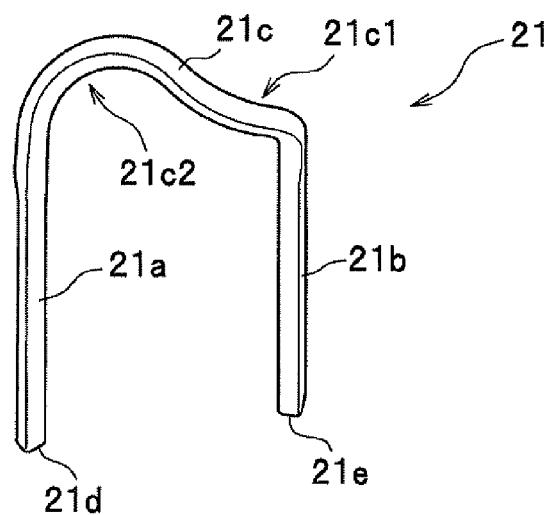
FIGS. 4A to 4C are diagrams showing the structure of the coil segments which are a part of the stator coil of the stator for a rotary electric machine, according to the embodiment, and are perspective views showing three kinds of coil segments having different shapes.

A coil segment 21 has, as shown concretely in FIG. 4A, a paired legs $21a$, $21b$ linearly formed, and a curved portion $21c$ in a curved shape that is continuously formed between one (the first) leg portion $21a$ and the other (the second) leg portion $21b$. The coil curved portion $21c$ is, as shown in FIG. 1, exposed on one end surface side of the stator core 10 in a state that the coil segment 21 is received in slots 11 of the stator core 10. Further, the respective end portions $21d$, $21e$ of the paired leg portions $21a$, $21b$ are provided with a hole portion, not shown, with a certain depth into which, for example, a fastening member 31 (refer to FIG. 9B describe later) is inserted when the coil segment 21 is connected with coil end plates 24, 25, or 26. Although a coil segment 21 is provided with hole portions, in the above-described example, for fastening by fastening members 31, hole portions may be not formed in a case of joining by a method, such as welding or the like.

Figure 6:
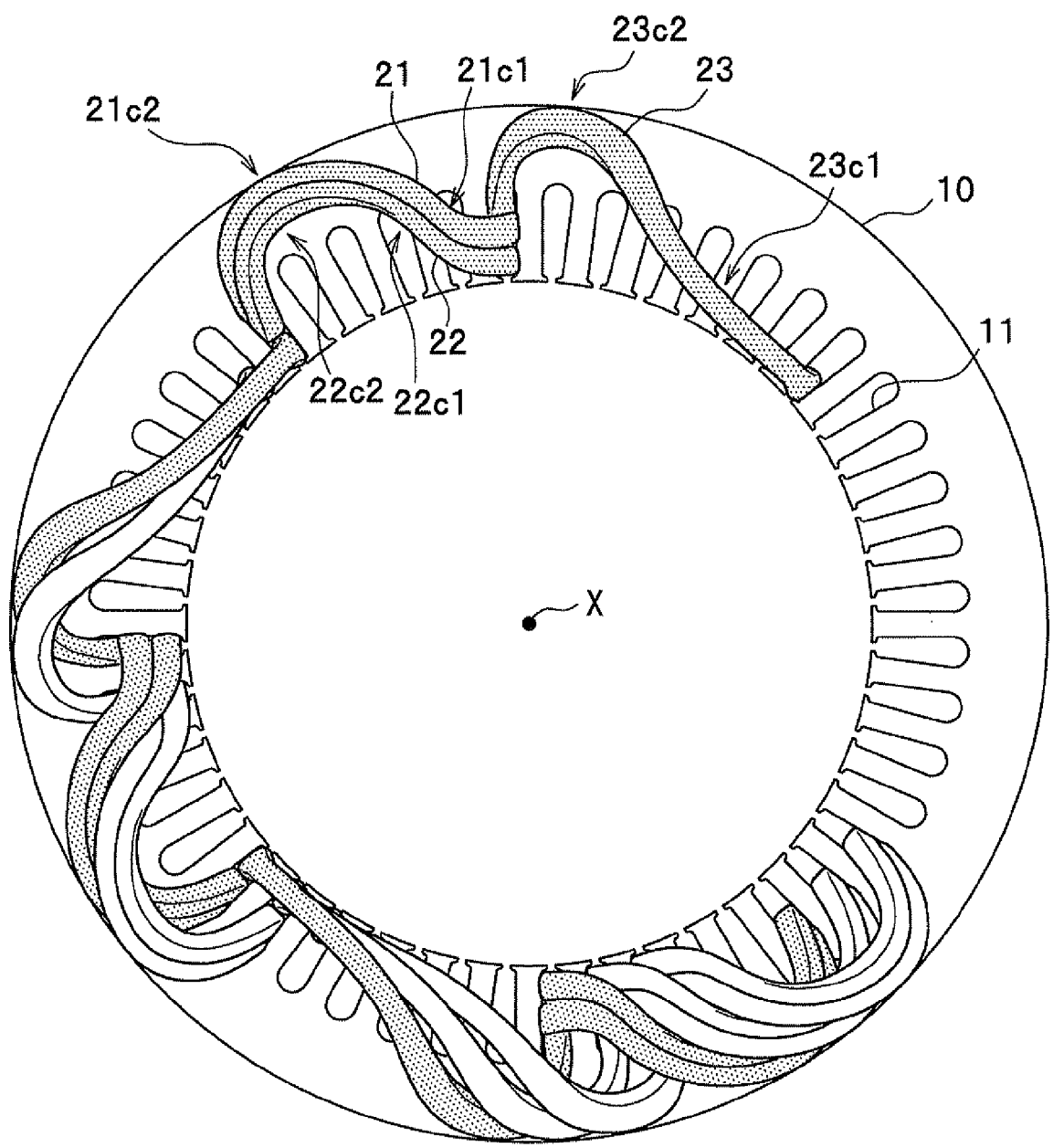
FIG. 6 is a diagram showing the structures of the stator core and the stator coil of the stator for a rotary electric machine, according to the embodiment, and is a plan view showing a state that partial coil segments are received in the slots of the stator core.

Herein, more concretely, the curved portion $21c$ of a coil segment 21 has a first curved portion $21c1$ and a second curved portion $21c2$, as shown in FIG. 4A and FIG. 6. The first curved portion $21c1$ is formed continuously from the other leg portion $21b$, as shown in FIG. 4A, and the second curved portion $21c2$ is continuously formed from the first curved portion $21c1$ to the one leg portion $21a$, as shown in FIG. 4A.

In a plan view, as shown in FIG. 6, the first curved portion $21c1$ is formed such as to curve toward the inner diameter side of the stator core 10, and the second curved portion $21c2$ is formed such as to curve toward the outer diameter side, with respect to different slots 11, of the stator core 10. One side surface (the side surface on the inner diameter side of the stator core 10) of the first curved portion $21c1$ is formed such as to be along the shape of the other side surface (the side surface on the outer diameter side of the stator core 10) of the first curved portion $22c1$ of the coil segment 22 received in the same slots 11, while the one side surface of the second curved portion $21c2$ is formed such as to be along the shape of the other side surface of the second curved portion $22c2$ of the coil segment 22 received in the same slots 11. The other side surface of the first curved portion $21c1$ is formed such as to be along the one side surface of the first curved portion $22c1$ of the coil segment 22 received in different slots (the slots on the right side) 11, and the other side surface of the second curved portion $21c2$ is formed such as to be within the outer diameter of the stator core 10.

The first curved portion $21c1$ and the second curved portion $21c2$ are, in a front view, formed such as to curve toward the one end surface side (the upper side) of the stator core 10. The lower surface (the surface on the other end surface side of the stator core 10) of the first curved portion $21c1$ is formed such as to be along the upper surfaces (the surfaces on the one end surface side of the stator core 10) of the first curved portions $21c1$, $22c1$ of the coil segments 21, 22 received in different slots (slots on the left side), while the lower surface of the second curved portion $21c2$ is formed such as to be along the upper surfaces of the second curved portions $21c2$, $22c2$ of the coil segments 21, 22 received in the different slots (the slots on the left side) 11. The upper surface of the first curved portion $21c1$ is formed such as to be along the lower surfaces of the first curved portions $21c1$, $22c1$ of the coil segments 21, 22 received in different slots (slots on the right side), while the upper surface of the second curved portion $21c2$ is formed such as to be along the lower surfaces of the second curved portions $21c2$, $22c2$ of the coil segments 21, 22 received in the different slots (the slots on the right side) 11.

In such a manner, on the upper surfaces and the lower surfaces of the first curved portion $21c1$ and the second curved portion $21c2$, the first curved portions and the second curved portions of coil segments 21, 22 received in different slots 11 are disposed along the first curved portion $21c1$ and the second curved portion $21c2$ without a gap. A coil segment 21 having a curved portion $21c$ with such a structure can be disposed such as to neighbor coil segments 21 and coil segments 22 disposed in the same or different slots 11, the neighboring relation being with respect to the radial direction and the rotation axis X direction of the stator core 10 and without a waste.

Figure 4B:
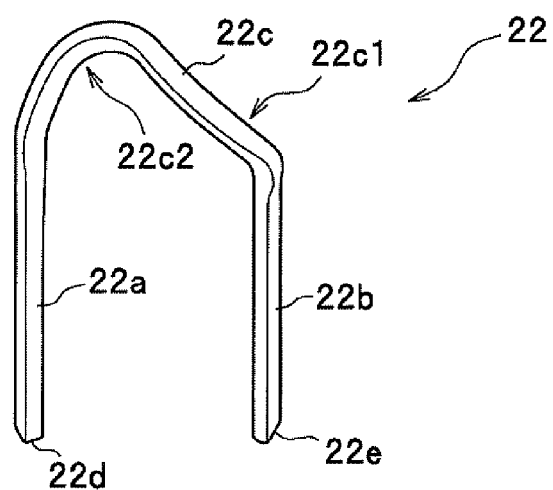

A coil segment 22, as shown concretely in FIG. 4B, has a pair of linearly formed leg portions $22a$, $22b$, and a curved portion $22c$ in a curve shape that is continuously formed between the one (the first) leg portion $22a$ and the other (the second) leg portion $22b$. The curved portion $22c$ is, as shown in FIG. 1, exposed on the one end surface side of the stator core 10 in a state that the coil segment 22 is received in slots 11 of the stator core 10. Further, the respective end portions $22d$, $22e$ of the paired leg portions $22a$, $22b$ are provided with a hole portion, not shown, with a certain depth into which, for example, a fastening member 31 (refer to FIG. 9B describe later) is inserted when the coil segment 22 is connected with coil end plates 24, 25, or 26. Although the coil segments 22 are provided with hole portions, in the above-described example, for fastening by fastening members 31, hole portions may be not formed in a case of joining by a method, such as welding or the like.

Herein, more concretely, the curved portion 22c of a coil segment 22 has a first curved portion 22c1 and a second curved portion 22c2, as shown in FIG. 4B and FIG. 6. The first curved portion 22c1 is formed continuously from the other leg portion 22b, as shown in FIG. 4B, and the second curved portion 22c2 is continuously formed from the first curved portion 22c1 to the one leg portion 22a, as shown in FIG. 4B.

In a plan view, as shown in FIG. 6, the first curved portion 22c1 is formed such as to curve toward the inner diameter side of the stator core 10, and the second curved portion 22c2 is formed such as to curve toward the outer diameter side, with respect to different slots 11, of the stator core 10. One side surface (the side surface positioned on the inner diameter side of the stator core 10) of the first curved portion 22c1 is formed such as not to enter inside the inner diameter of the stator core 10, while the one side surface of the second curved portion 22c2 is formed such as to be along the shape of the other side surface of the second curved portion 21c2 of the coil segment 21 received in different slots (slots on the left side) 11. The other side surface of the first curved portion 22c1 is formed such as to be along the one side surface of the first curved portion 21c1 of the coil segment 21 received in the same slots 11, and the other side surface of the second curved portion 22c2 is formed such as to be along the one side surface of the second curved portion 21c2 of the coil segment 21 received in the same slots 11.

The first curved portion 22c1 and the second curved portion 22c2 are, in a front view, formed such as to curve toward the one end surface side (the upper side) of the stator core 10. The lower surface (the surface on the other end surface side of the stator core 10) of the first curved portion 22c1 is formed such as to be along the upper surfaces (the surfaces on the one end surface side of the stator core 10) of the first curved portions 21c1, 22c1 of the coil segments 21, 22 received in different slots (slots on the left side), while the lower surface of the second curved portion 22c2 is formed such as to be along the upper surfaces of the second curved portions 21c2, 22c2 of the coil segments 21, 22 received in the different slots (the slots on the left side) 11. The upper surface of the first curved portion 22c1 is formed such as to be along the lower surfaces of the first curved portions 21c1, 22c1 of the coil segments 21, 22 received in different slots (slots on the right side), while the upper surface of the second curved portion 22c2 is formed such as to be along the lower surfaces of the second curved portions 21c2, 22c2 of the coil segments 21, 22 received in the different slots (the slots on the right side) 11.

In such a manner, on the upper surfaces and the lower surfaces of the first curved portion 22c1 and the second curved portion 22c2, the first curved portions and the second curved portions of coil segments 21, 22 received in different slots 11 are disposed along the first curved portion 22c1 and the second curved portion 22c2 without a gap. A coil segment 22 having a curved portion 22c with such a structure can be disposed, neighboring coil segments 21 and coil segments 22 disposed in the same or different slots 11, the neighboring relation being with respect to the radial direction and the rotation axis X direction of the stator core 10 and without a waste.

Figure 4C:
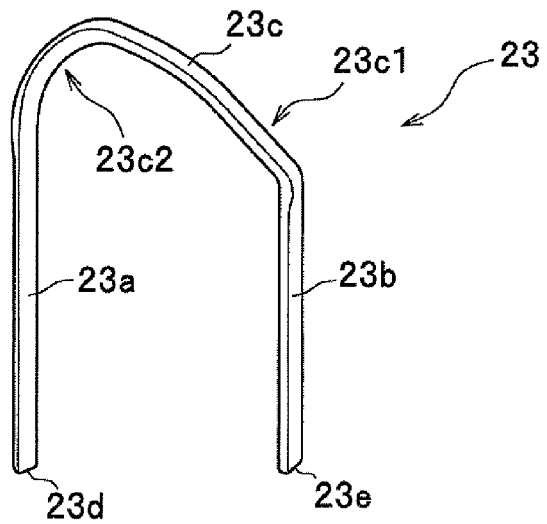

A coil segment 23, as shown concretely in FIG. 4C, has a pair of linearly formed leg portions 23a, 23b, and a curved portion 23c in a curve shape formed continuously between the one (the first) leg portion 23a and the other (the second) leg portion 23b. The curved portion 23c is, as shown in FIG. 1, exposed on the one end surface side of the stator core 10 in a state that coil segment 23 is received in slots 11 of the stator core 10. Further, the respective end portions 23d, 23e of the paired leg portions 23a, 23b are provided with a hole portion, not shown, with a certain depth into which, for example, a fastening member 31 (refer to FIG. 9B describe later) is inserted when the coil segment 23 is connected with coil end plates 24, 25, or 26. Although the coil segments 23 are provided with hole portions, in the above-described example, for fastening by fastening members 31, hole portions may be not formed in a case of joining by a method, such as welding or the like. Herein, a coil segment 23 is connected with coil end plates 24, 25, or 26 on the other end surface side of the stator core 10, and thereby forms a coil turn by itself and also functions as a crossover member for connecting coil turns formed in a plural number along the circumferential direction of the stator core 10. Coil turns formed on the stator 1 will be described later in detail (refer to FIG. 19 described later).

Herein, more concretely, the curved portion 23c of a coil segment 23 has a first curved portion 23c1 and a second curved portion 23c2, as shown in FIG. 4C and FIG. 6. The first curved portion 23c1 is formed continuously from the other leg portion 23b, as shown in FIG. 4C, and the second curved portion 23c2 is continuously formed from the first curved portion 23c1 to the one leg portion 23a, as shown in FIG. 4C.

In a plan view, as shown in FIG. 6, the first curved portion 23c1 is formed such as to curve toward the inner diameter side of the stator core 10, and the second curved portion 23c2 is formed such as to curve toward the outer diameter side, with respect to different slots 11, of the stator core 10. One side surface (the side surface on the inner diameter side of the stator core 10) of the first curved portion 23c1 is formed such as not to enter inside the inner diameter of the stator core 10, while the one side surface of the second curved portion 23c2 is formed such as to be along the shape of the other side surface (the side surface positioned on the outer diameter side of the stator core 10) of the second curved portion 23c2 of the coil segment 23 received in different slots (slots on the left side) 11. The other side surface of the first curved portion 23c1 is formed such as to be along the one side surface of the first curved portion 23c1 of the coil segment 23 received in different slots (slots on the left side) 11, and the other side surface of the second curved portion 23c2 is formed such as to be along the one side surface of the second curved portion 23c2 of the coil segment 23 received in different slots (on the right side) 11.

The first curved portion 23c1 and the second curved portion 23c2 are, in a front view, formed such as to curve toward the one end surface side (the upper side) of the stator core 10. The lower surface (the surface on the other end surface side of the stator core 10) of the first curved portion 23c1 is formed such as to be along the upper surface (the surfaces on the one end surface side of the stator core 10) of the first curved portion 23c1 of the coil segment 23 received in different slots (slots on the left side), while the lower surface of the second curved portion 23c2 is formed such as to be along the upper surface of the second curved portion 23c2 of the coil segment 23 received in the different slots (the slots on the right side) 11. The upper surface of the first curved portion 23c1 is formed such as to be along the lower surface of the first curved portion 23c1 of the coil segment 23 received in different slots (slots on the right side), while the upper surface of the second curved portion 23c2 is formed such as to be along the lower surface of the second curved portion 23c2 of the coil segment 23 received in the different slots (the slots on the left side) 11.

In such a manner, on the upper surfaces and the lower surfaces of the first curved portion 23c1 and the second curved portion 23c2, the first curved portion and the second curved portion of a coil segment 23 received in different slots 11 are disposed along the first curved portion 23c1 and the second curved portion 23c2 without a gap. A coil segment 23 having a curved portion 23c with such a structure can be disposed, neighboring coil segments 23 disposed in different slots 11, the neighboring relation being with respect to the radial direction and the rotation axis X direction of the stator core 10 and without a waste.

Figure 5A:
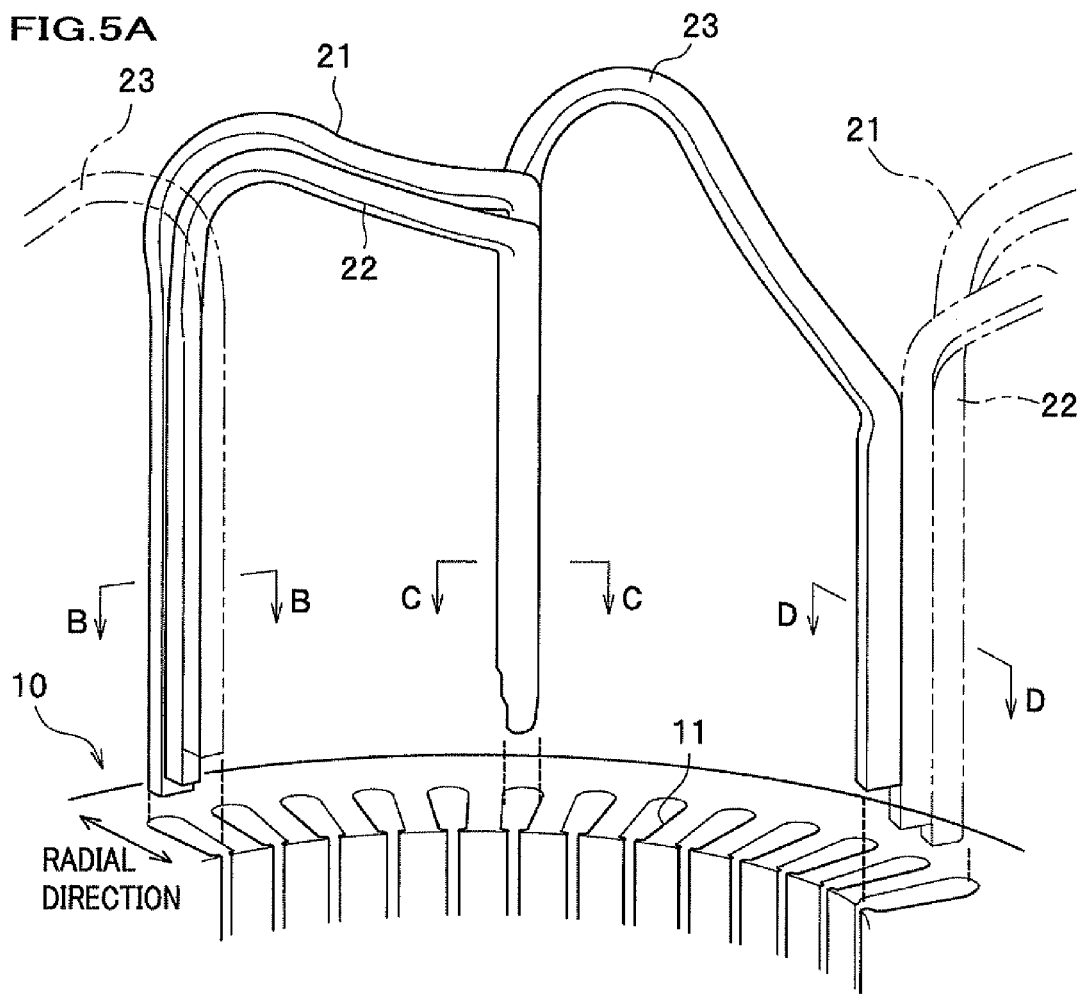

The paired leg portions of coil segments 21, 22, 23 are, as shown in FIGS. 4A to 4C, formed in a shape that is open with a certain distance between the leg portions. Thus, the paired leg portions of coil segments 21, 22, 23 are, as shown in FIG. 5A, received respectively in two different slots 11 of the stator core 10. The order of reception of coil segments 21, 22, 23 by the slots 11 of the stator core 10 is set in advance, and the pairs of leg portions are formed in cross-sectional shapes such as to match the shape of the slots 11 (refer to FIG. 5B described later).

The open distances between the pairs of coil segments are formed the same for all of the pairs of the coil segments 21, 22. As shown concretely in FIG. 5A, the distance between the pair of the leg portions of a coil segment 21 or 22 is formed such that, assuming that one leg portion 21a or 22a is received by a slot 11 of the stator core 10, the other leg portion 21b or 22b is received by a slot 11 which is the fifth from the slot 11 receiving the one leg portion 21a or 22a (the fifth slot 11 with respect to the circumferential direction of the stator core 10). However, the open distance between the pair of leg portions of a coil segment 21 or 22 is not particularly limited, and can be changed, as appropriate, corresponding to the number of phases of currents supplied from outside.

The distance between the pair of leg portions of a coil segment 23 is formed different from that for a coil segment 21, 22. As shown concretely in FIG. 5A, the distance between the pair of leg portions of a coil segment 23 is formed such that, assuming that one leg portion 23a is received in a slot 11 of the stator core 10, the other leg portion 23b is received by the seventh slot 11 from the slot 11 receiving the one leg portion 23a (the seventh slot 11 with respect to the circumferential direction of the stator core 10). This is because, as described above, a coil segment 23 functions as a crossover member for connecting coil turns formed in a plural number with respect to the circumferential direction of the stator core 10. However, the open distance between the pair of leg portions of a coil segment 23 is not particularly limited, and can be changed, as appropriate, corresponding to the number of phases of currents supplied from outside.

As shown in FIGS. 4A to 4C, coil segments 21, 22, 23 are primarily different from each other in the shapes of the curved portions 21c, 22c, 23c. That is, as shown in FIGS. 4A to 4C, the curved portions 21c, 22c, 23c are formed in curves with different angles. The differences in the shapes of the curved portions of coil segments, as shown in FIGS. 4A to 4C, correspond to the number of coil turns formed, for the stator coil 20, along the radial direction of the stator core 10 (the number of coil turns of a coil loop).

Herein, a coil turn refers to an annular current path formed by that the pairs of leg portions of a coil segment 21, 22, 23 are received by two slots 11 of the stator core 10, and the end portions of the pair of leg portions of the coil segment 21, 22, 23, which are received by the two slots, are electrically connected with different coil end plates on the end surface side of the stator core 10 (refer to FIG. 19 described later). Such coil turns (current paths) are formed in a plural number with respect to the radial direction of the stator core 10, corresponding to the number of combinations of coil segments 21, 22, 23 inserted in the same slots 11 of the stator core 10 and corresponding coil end plates 24, 25, 26, and, on the other hand, in a plural number with respect to the circumferential direction of the stator core 10, corresponding to the number of combinations of coil segments 21, 22, 23 inserted in different slots 11 of the stator core 10 and corresponding coil end plates 24, 25, 26 (refer to FIG. 19 described later).

A coil loop refers to a current path (a current path around the rotation axis X of the rotary electric machine) that is arranged over the whole stator 1 and is formed by all coil turns in a group formed in the radial direction and the circumferential direction of the stator core 10 (refer to FIG. 20). Such coil loops are arranged in two kinds that are concretely clockwise coil loops and counterclockwise coil loops (refer to FIG. 20 described later).

Herein, for the stator 1 according to the present embodiment, as described later, three coil segments received by slots 11 of the stator core 10 form three coil turns with respect to the radial direction of the stator core 10 (refer to FIG. 19 described later). Therefore, for the stator 1 according to the present embodiment, three coil segments with different shapes of curved portion, as shown in FIGS. 4A to 4C, are used. Thus, as shown in FIG. 5A, for the stator 1 according to the present embodiment, when the pairs of leg portions of coil segments 21, 22, 23 are lapped with respect to the radial direction of the stator core 10, and three leg portions are combined and received in a slot 11 of the stator core 10, the respective curved portions 21c, 22c, 23c are disposed neighboring each other with respect to the radial direction of the stator core 10.

For the stator 1 according to the present embodiment, as coil segments 21, 22, 23 with different shapes of curved portion are received in combination by a slot 11 of the stator core 10, the coil segments 21, 22, 23 can be disposed, avoiding interference with other coil segments 21, 22, 23, as shown in FIG. 6, and can be disposed within the shape of the other end surface of the stator core 10 and within a certain height on the other end surface of the stator core 10. That is, for the stator 1, even with coil segments of a rigid conductor, which are different from ordinary winding wires, it is possible to form a state of lap winding just like a winding wire. Accordingly, for the stator 1, lap winding of rigid conductor is realized, and the volume of the exposed portions of coil segments 21, 22, 23, the exposed portions being exposed from an end surface of the stator core 10, can be reduced as much as possible. Further, for the stator 1, as it is possible to efficiently dispose coil segments 21, 22, 23 without a waste, the area occupation ratio of coils can be improved.

Further, though not shown, for the stator 1 according to the present embodiment, coil segments 21, 22, 23 are used which are different not only in the shape of a curved portion but also in the length of paired leg portions. The differences in the length of paired legs between such coil segments correspond to the number of phases of current supplied to the stator coil 20 from outside.

Herein, as described later, for the stator 1 according to the present embodiment, coil end plates 24, 25, 26 are laminated on the other end surface of the stator core 10 in a number obtained by multiplying the number of coil turns (the number of turns of a coil loop) formed along the radial direction of the stator core 10 and the number of phases of currents supplied from outside (refer to FIG. 12 described later). In this case, the number of layers of coil end plates 24, 25, 26 increases in multiplication corresponding to the number of phases of current, and the distance between a coil segment and a coil end plate becomes larger along the rotation axis X of the rotary electric machine. Accordingly, for the stator 1 according to the present embodiment, coil segments 21, 22, 23 are prepared respectively with three different lengths of paired leg portions. That is, for the stator 1, multiplying the number of differences in the shape of curved portion and the number of differences in the length of paired leg portions, coil segments in nine kinds are used totally. In such a manner, for the stator 1 according to the present embodiment, neighboring coil segments 21, 22, 23 are disposed, at the same height on the side of the curved portions, and with steps on the side of coil end plates 24, 25, 26. For the stator 1, when currents in plural phases are supplied from outside, even in a case that the number of laminations of coil end plates 24, 25, 26 laminated on the other end surface side of the stator core 10 increases, corresponding to the number of phases of currents, and the distances between coil segments 21, 22, 23 and coil end plates 24, 25, 26 are extended with the stator core 10 therebetween, it is possible to adjust the lengths of the leg portions of the segments 21, 22, 23, corresponding to the extended distances. Thus, for the stator 1, it is possible to easily connect coil end plates with coil segments disposed on respective layers, and improve the assembly.

Figure 7:
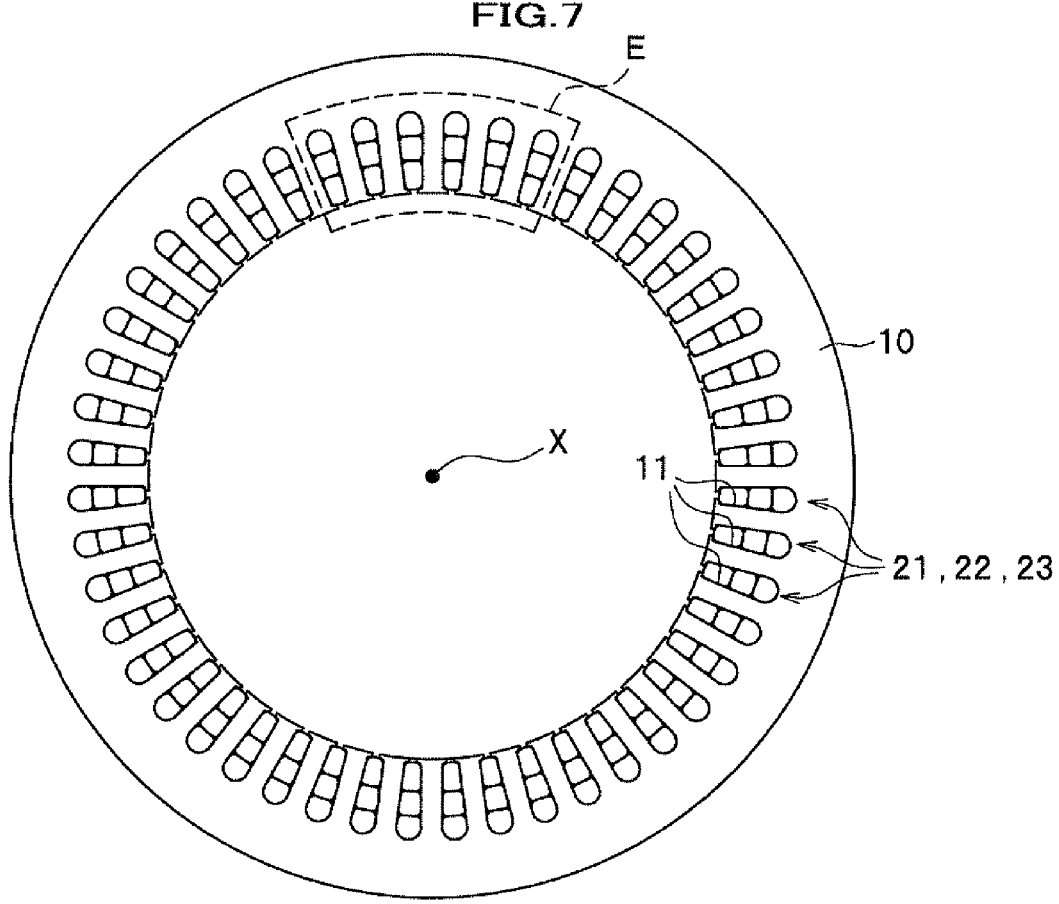
FIG. 7 is a diagram showing the structures of the stator core and the stator coil of the stator for a rotary electric machine, according to the embodiment, and is a cross-sectional view taken along A-A in FIG. 1, showing a state that all the coil segments are received in the slots of the stator core.

Each of coil segments 21, 22, 23 having such a structure is inserted from the one end surface side of the stator core 10 into two different slots 11 of the stator core 10. More concretely, coil segments 21, 22, 23 are, as shown in FIG. 7, received in slots 11 of the stator core 10 in a state, as shown in FIG. 5A, that the leg portions thereof are lapped in a certain order along the radial direction of the stator core 10. The end portions of paired leg portions of coil segments 21, 22, 23 received in slots 11 are electrically connected with the paired second extended portions (refer to FIGS. 10A to 10C described later) of coil end plates 24, 25, 26 by fastening members 31 (refer to FIG. 9B described later) on the other end surface side of the stator core 10. Incidentally, instead of fastening by fastening members 31, fixing may be carried out by crimp fitting, welding, brazing, or the like.

Figure 5B:
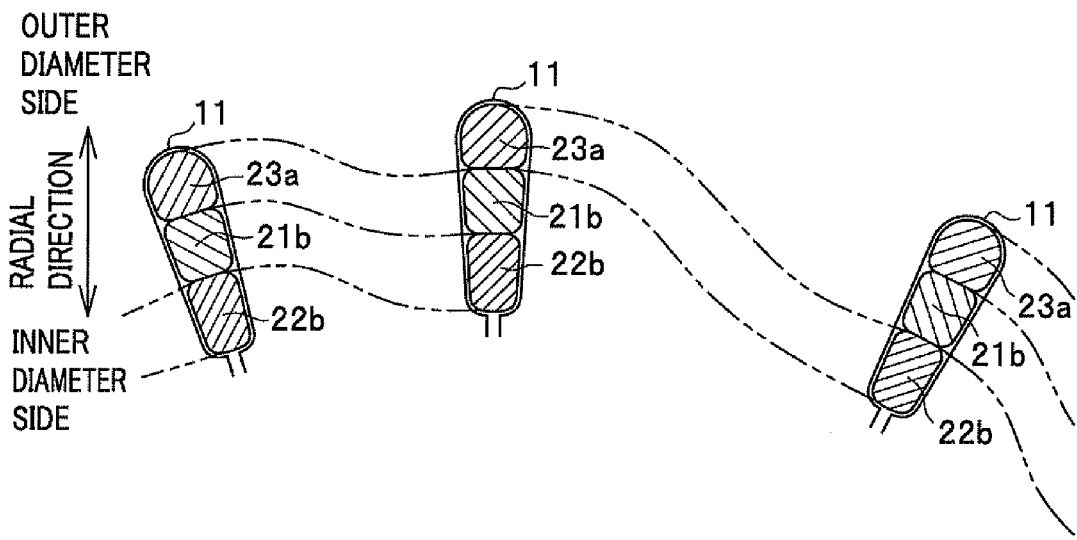

Incidentally, in case that the paired leg portions of coil segments 21, 22, 23 are lapped in a certain order along the radial direction of the stator core 10, as shown in FIG. 5A, the leg portions are formed such as to have different cross-sectional shapes, as shown in FIG. 5B. On the other hand, the paired leg portions of the coil segment 21, 22, 23 have, as shown concretely in FIG. 5B, the same cross-sectional area, while the closer to the outer diameter side of the stator core 10 a coil segment is received, the larger the width of the cross-sectional shape is. In case that the paired leg portions of coil segments 21, 22, 23 are lapped in a certain order along the radial direction of the stator core 10, as shown in FIG. 5A, the leg portions are formed such as to have the same cross-sectional shape (refer to FIG. 2), when combined, as that of a slot 11 of the stator core 10, as shown in FIG. 5B. In such a manner, for the stator 1 according to the present embodiment, it is possible to make the cross-sectional shape of a slot 11 and the cross-sectional shape of combination of plural coil segments 21, 22, 23, which are received in the slot 11 in a certain order, be the same, and the cross section has a tapered shape whose width becomes larger as going away along the radial direction from the inner diameter side. Thus, compared with a case of a cross-sectional shape with a constant width, coil segments received in slots 11 can be held more securely. However, in case that slots 11 are formed, as described above, with a constant width, the paired leg portions of coil segment 21, 22, 23 may be formed with a uniform width to match with the cross-sectional shape of the slots 11.

As shown in FIG. 5B, the paired leg portions of coil segment 21, 22, or 23 are received in slots 11 of the stator core 10 in a state that one leg portion and the other leg portion are shifted from each other along the radial direction of the stator core 10. For example, as shown in FIG. 5B, if one leg portion 21a of a coil segment 21 is received by a slot 11 at the position on the outermost diameter side of the slot 11, the other leg portion 21b corresponding to the leg portion 21a is received, as shown in FIG. 5B, at a central position of a slot 11, the central position being shifted by one to the inner diameter side. Likewise, a coil segment 22, 23 is received such that one leg portion and the other leg portion thereof are received at respective positions shifted from each other along the radial direction.

As shown in FIG. 5A, in the respective slots 11 of the stator core 10, coil segments 21, 22, 23 are received in a number of three along the radial direction of the stator core 10. The number of coil segment 21, 22, 23 received in one slot 11 of the stator core 10 corresponds to the number of coil turns (the number of turns of a coil loop). Herein, as described later, for the stator 1 according to the present embodiment, in order that three coil turns are formed along the radial direction of the stator core 10 (refer to FIG. 20 described later), coil segments 21, 22, 23 are received in a number of three along the radial direction of the stator core 10, as shown in FIG. 5A.

Figure 8:
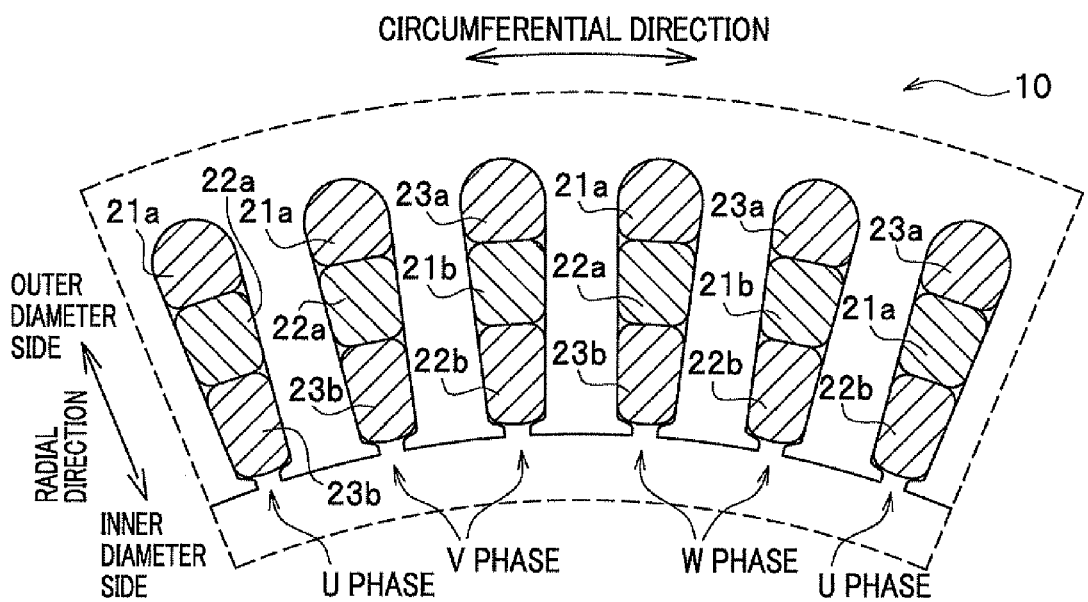
FIG. 8 is a diagram showing the structures of the stator core and the stator coil of the stator for a rotary electric machine, according to the embodiment, and is an enlarged view of part E in FIG. 7 which shows a state that all the coil segments are received in the slots of the stator core.

Currents in respective phases supplied from outside flow in the coil segments 21, 22, 23 received in the slots 11 of the stator core 10, as shown in FIG. 8. That is, as in the case of the stator 1 according to the present embodiment, if currents in three phases are supplied from outside, a current in U-phase flows in (the leg portions 21a, 22a, 23b of) the coil segments received by the slot 11 on the left end side and in (the leg portions 23a, 21b, 22b of) the coil segments received by the slot 11 on the right end side. A current in V-phase flows in (the leg portions 21a, 22a, 23b of) the coil segments received by the slot 11 that is the second from the left end and in (the leg portions 23a, 21b, 22b of) the coil segments received by the slot 11 that is the third from the left end. A current in W-phase flows in (the leg portions 21a, 22a, 23b of) the coil segments received by the slot 11 that is the fourth from the left end and in (the leg portions 23a, 21b, 22b of) the coil segments received by the slot 11 that is the fifth from the left end.

Further, though not shown, in coil segments that are received in the slots positioned next to the slots 11 at the left end and the right (left and right) end in FIG. 8, a current in U-phase flows. Accordingly, in the coil segments 21, 22, 23 received in the slots 11 of the stator core 10, currents in three phases flow two rows by two rows around the rotation axis X of the rotary electric machine in such a manner as U-phase, U-phase, V-phase, V-phase, W-phase, W-phase, U-phase, U-phase, . . . . Incidentally, as has been described with reference to FIG. 4, the coil segments 21, 22 received in the slot 11 at the left end in FIG. 8 and the coil segments 21, 22 received in the slot 11 at the right in FIG. 8 are the same coil segments.

Structures of Coil End Plates 24, 25, 26

Coil end plates 24, 25, 26, which are a part of the stator coil 20 will be described below in detail.

Figure 9A:
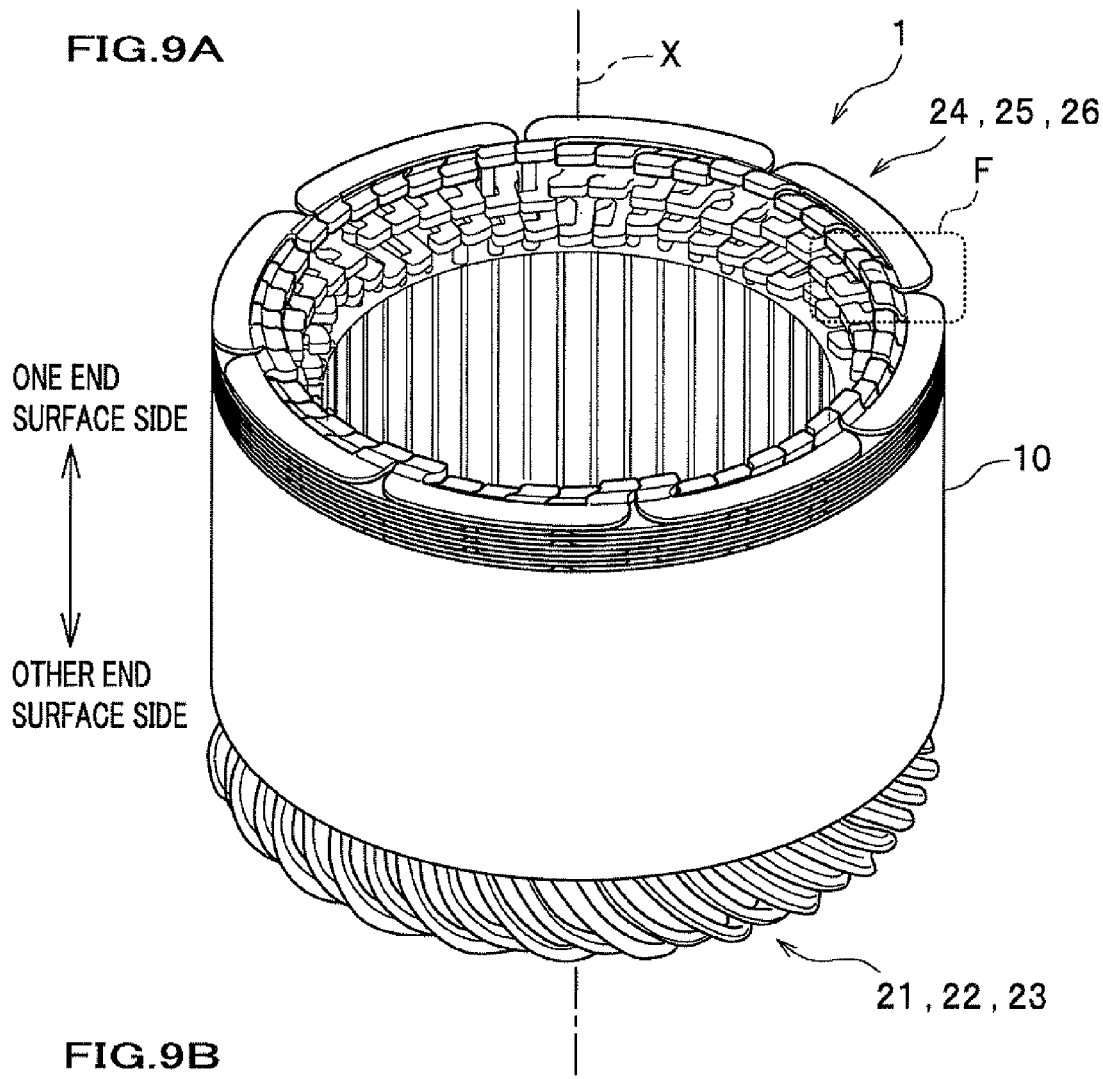
Figure 9B:
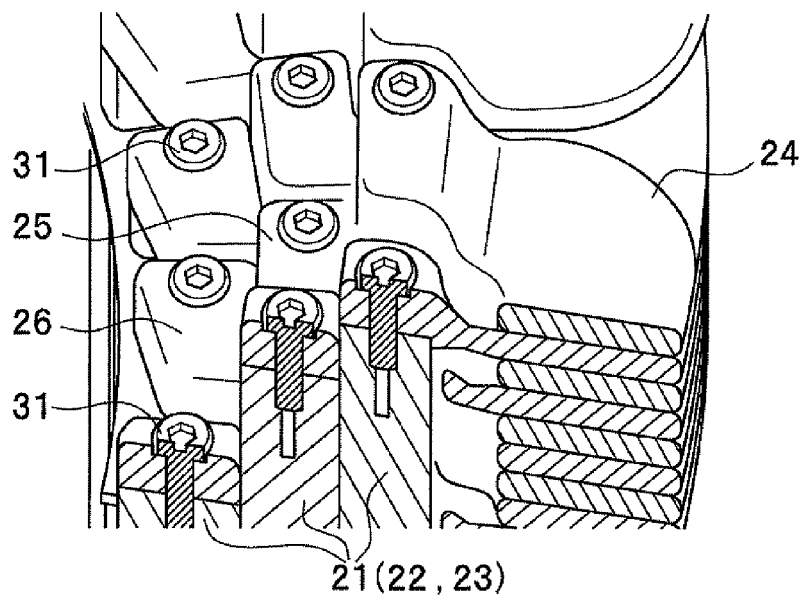

Coil end plates 24, 25, 26 are, as shown in FIGS. 9A and 9B, coil end members of the stator coil 20, and are used to transfer currents flowing in coil segments 21, 22, 23 to different coil segments 21, 22, 23, on the other end surface side of the stator core 10. Coil end plates 24, 25, 26 are arranged, for example, by a conductive member in a plate shape made from, for example, copper, copper alloy, aluminum, aluminum alloy, or the like. The material for coil end plates 24, 25, 26 is not particularly limited as long as the material is excellent in conductivity and formability.

Figure 10A:
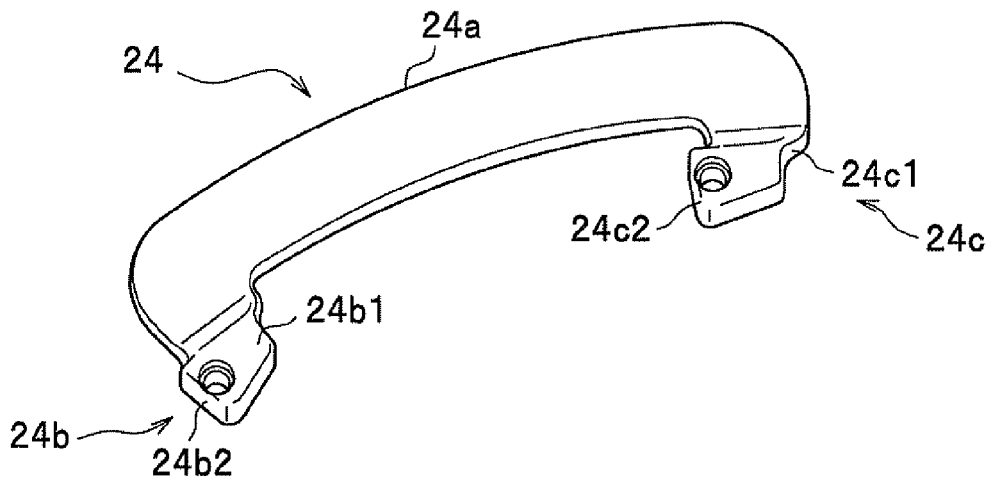

A coil end plate 24 has, as shown concretely in FIG. 10A, a plate portion 24a formed in a flat plate shape and a pair of extended portions 24b, 24c extended from one end side of the plate portion 24a. The extended portions 24b, 24c have, as shown concretely in FIG. 10A, a pair of first extended portions 24b1, 24c1 extended from the one end side of the plate portion 24a, and a pair of second extended portions 24b2, 24c2 extended respectively from one end side of the pair of first extended portions 24b1, 24c1. Further, the second extended portions 24b2, 24c2 are respectively provided with a penetrating hole portion into which a fastening member 31, as shown in FIG. 9B as an example, is inserted when the coil end plate 24 and a coil segment 21, 22, 23 are connected. Although, in the above example, hole portions for fastening by fastening members 31 are formed for a coil end plate 24, hole portions may be not formed in case of joining by a method, such as welding.

Figure 10B:
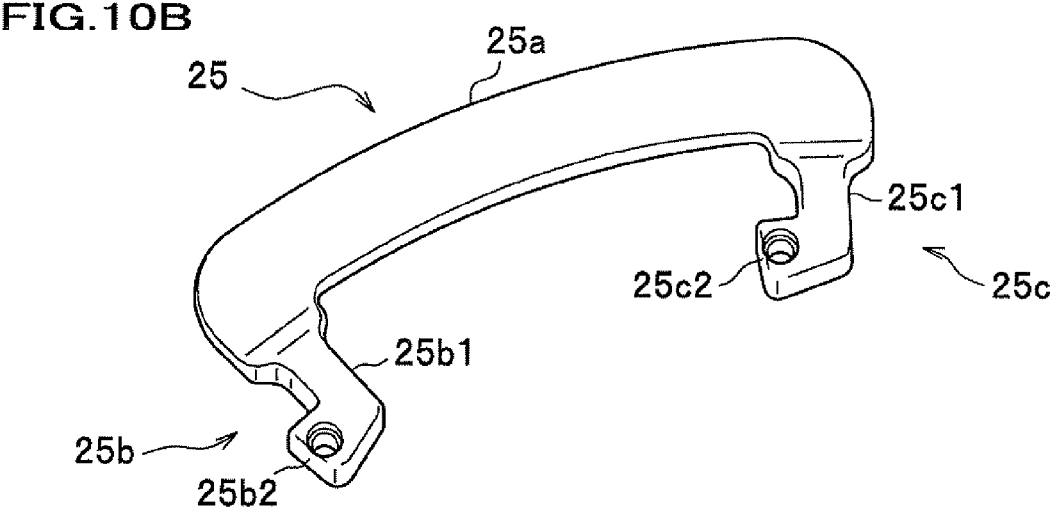

A coil end plate 25 has, as shown concretely in FIG. 10B, a plate portion 25a formed in a flat plate shape and a pair of extended portions 25b, 25c extended from one end side of the plate portion 25a. The extended portions 25b, 25c have, as shown concretely in FIG. 10B, a pair of first extended portions 25b1, 25c1 extended from the one end side of the plate portion 25a, and a pair of second extended portions 25b2, 25c2 respectively extended from one end side of the pair of first extended portions 25b1, 25c1. Further, the second extended portions 25b2, 25c2 are respectively provided with a penetrating hole portion into which a fastening member 31, as shown in FIG. 9B as an example, is inserted when the coil end plate 25 and a coil segment 21, 22, or 23 are connected. Although, in the above example, hole portions for fastening by fastening members 31 are formed for a coil end plate 25, hole portions may be not formed in case of joining by a method, such as welding.

Figure 10C:
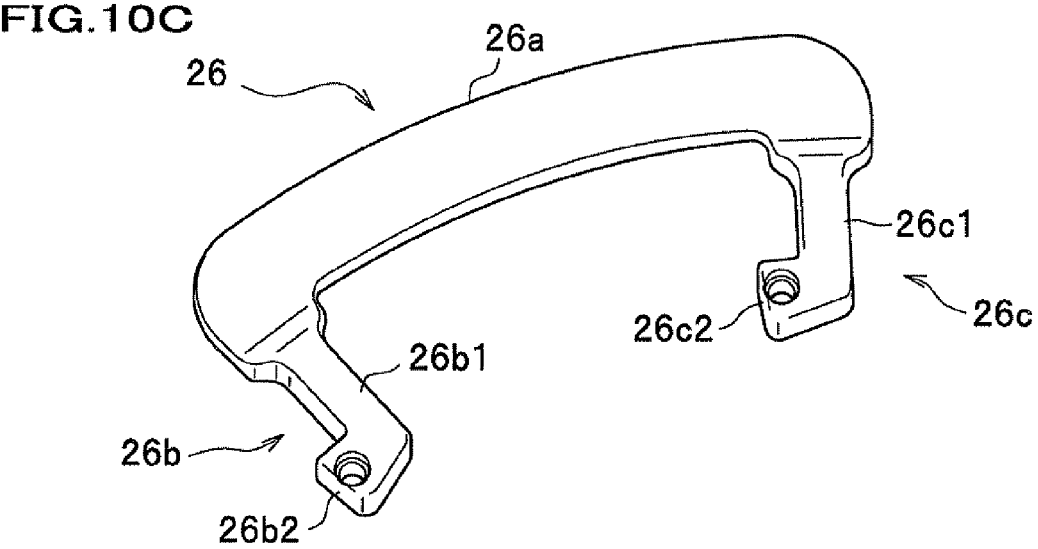

A coil end plate 26 has, as shown concretely in FIG. 10C, a plate portion 26a formed in a flat plate shape and a pair of extended portions 26b, 26c extended from one end side of the plate portion 26a. The extended portions 26b, 26c have, as shown concretely in FIG. 10C, a pair of first extended portions 26b1, 26c1 extended from the one end side of the plate portion 26a, and a pair of second extended portions 26b2, 26c2 extended respectively from one end side of the pair of first extended portions 26b1, 26c1. Further, the second extended portions 26b2, 26c2 are respectively provided with a penetrating hole portion into which a fastening member 31, as shown in FIG. 9B as an example, is inserted when the coil end plate 26 and a coil segment 21, 22, or 23 are connected. Although, in the above example, hole portions for fastening by fastening members 31 are formed for a coil end plate 26, hole portions may be not formed in case of joining by a method, such as welding.

The plate portions of coil end plates 24, 25, 26 are, as shown in FIGS. 9A to 10C, formed such as to extend along the circumferential direction of the stator core 10, wherein the coil end plates 24, 25, 26 are arranged on the end surface of the stator core 10. That is, the coil end plates 24, 25, 26 are, as shown in FIG. 9A, formed, matching with the shape of the end surface of the stator core 10.

Figure 11A:
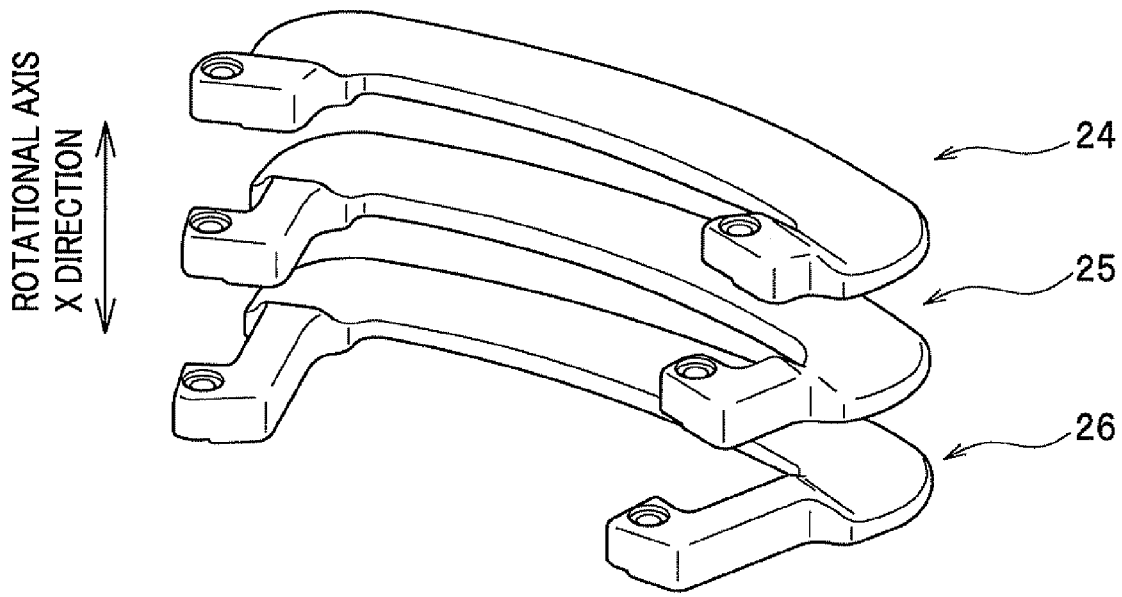
Figure 11B:
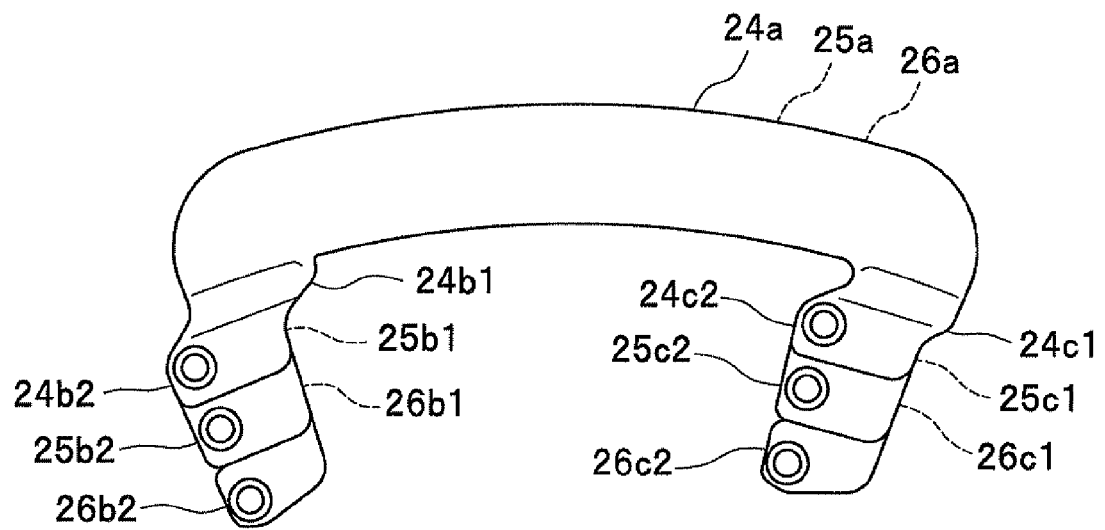

The plate portions of the coil end plates 24, 25, 26 are formed such as to have the same largeness of area in a plan view. Accordingly, as shown in FIG. 11A, when the coil end plates 24, 25, 26 are lapped in this order along the rotation axis X direction of the rotary electric machine and viewed in a plan view, the plate portions of the coil end plates 24, 25, 26 are disposed to be overlapped with each other at the same position, as shown in FIG. 11B. Thus, when the coil end plates 24, 25, 26 are lapped, only the plate portion 24a, which is arranged uppermost, is exposed while the other plate portions 25a, 26a are not exposed, as shown in FIG. 11B.

The respective pairs of extended portions of the coil end plates 24, 25, 26 are, as shown in FIGS. 9A to 10C, formed such as to extend in an L-shape from one end side of the respective plate portions, wherein the coil end plates 24, 25, 26 are arranged on the end surface of the stator core 10. Further, as shown in FIGS. 10A to 11B, the respective pairs of extended portions of the coil end plates 24, 25, 26 are formed thicker than the plate portions of the coil end plates 24, 25, 26. Thus, for the stator 1 according to the present embodiment, even in case that coil end plates are formed thin, the cross-sectional resistance values of members that form coil loops can be made uniform.

The respective pairs of the first extended portions of the coil end plates 24, 25, 26 are, as shown in FIGS. 9A to 10C, formed such as to extend along the radial direction of the stator core 10, wherein the coil end plates 24, 25, 26 are arranged on the end surface of the stator core 10. The respective pairs of the second extended portions of the coil end plates 24, 25, 26 are, as shown in FIGS. 9A to 10C, formed such as to extend along the same direction, namely the circumferential direction of the stator core 10. Thus, for the stator 1 according to the present embodiment, the extension direction of the pairs of the first extended portions and the pairs of the second extended portions of coil end plates 24, 25, 26 are perpendicular to each other, and the pairs of the second extended portions of the coil end plates 24, 25, 26 has the same extension direction. Accordingly, when a plurality of coil end plates are lapped along the rotation axis direction of the rotary electric machine, the second extended portions of coil end plates 24, 25, 26 do not overlap with the first extended portions of other coil end plates. Thereby, the area occupation ratio of coils can be increased by the use of coil end plate 21, 22, 23. Further, the volume of the crossover portions of coils on the other end surface of the stator core 10 can be reduced by the use of coil end plate 24, 25, 26. Still further, a space for fastening by fastening members 31 can be ensured in laminating coil end plates 24, 25, 26. Yet further, for the stator 1, coil end plates 24, 25, 26 can be laminated with regularity by extending the second extended portions of the coil end plate 24, 25, 26 in the same direction.

The pairs of extended portions of coil end plates 24, 25, 26 are, as shown in FIG. 10A to 10C, respectively have a certain distance therebetween and are extended from one end side of the plate portions 24a, 24b, 24c. The paired extended portions of the coil end plates 24, 25, 26 are thereby electrically connected with the pairs of coil segments 21, 22, 23 received in respective two different slots 11 of the stator core 10 (refer to FIG. 19 described later).

All the distances between the respective pairs of the extended portions of coil end plates 24, 25, 26 are formed to be equal to each other. This distance between the respective pairs of the extended portions of coil end plates 24, 25, 26 is formed to be substantially equal to the open distance between the respective pairs of leg portions of coil segments 21, 22. In such manner, the coil end plates 24, 25, 26 form coil turns together with corresponding coil segments 21, 22 (refer to FIG. 19 described later).

As shown in FIGS. 10A to 10C, the lengths of the extended portions 24b, 24c, 25b, 25c, 26b, 26c are different. That is, as shown in FIGS. 9A to 10C, the lengths of the extended portions 24b, 24c, 25b, 25c, 26b, 26c are formed to have different lengths with respect to the radial direction of the stator core 10, wherein coil end plates 24, 25, 26 are disposed on the end surface of the stator core 10. Coil end plates with different shapes of extended portions, such as shown in FIGS. 10A to 10C, correspond to the number of formed coil turns of the stator coil 20 (the number of turns of a coil loop) with respect to the radial direction of the stator core 10.

Herein, as described later, for the stator 1 according to the present embodiment, three coil segments are received in a slot 11 of the stator core 10 to form three coil turns along the radial direction of the stator core 10 (refer to FIG. 19 described later). Accordingly, as shown in FIGS. 10A to 10C, for the stator 1 according to the present embodiment, three kinds of coil end plates with different shapes of extended portions are used. In such a manner, for the stator 1 according to the present embodiment, as coil end plates 24, 25, 26, having extended portions with different lengths, are used in the same number as the number of coil turns (the number of turns of a coil loop), the extended portions (the second extended portions) of coil end plates 24, 25, 26 do not overlap with the extended portions of other coil end plates 24, 25, 26, regardless of the number of coil turns. In such a manner, the area occupation ratio of coils can be increased by the use of coil end plate 21, 22, 23. Further, the volume of the crossover portions of coils on the other end surface of the stator core 10 can be reduced by the use of coil end plate 24, 25, 26. Still further, a space for fastening by fastening members 31 can be ensured in laminating coil end plates 24, 25, 26, regardless of the number of coil turns.

As described above, as the pairs of the first extended portions of coil end plates 24, 25, 26 are formed with respective different lengths, the coil end plates 24, 25, 26 are, as shown in FIG. 11A for example, lapped in this order along the rotation axis X direction of the rotary electric machine, and are disposed such as to partially overlap with each other in a plan view, as shown in FIG. 11B. On the other hand, the pairs of the second extended portions of coil end plates 24, 25, 26 are, in a plan view as shown in FIG. 11B, disposed such as not to overlap with each other, and all of them are exposed.

Coil end plates 24, 25, 26 having such a structure are, as shown in FIG. 12, arranged on the other end surface side that is opposite to the one end surface side of the stator core 10 where the curved portions of coil segments 12, 22, 23 are exposed. The coil end plates 24, 25, 26 arranged on the other end surface side of the stator core 10 are, as shown in FIG. 12, laminated in a plural number along the rotation axis X direction of the rotary electric machine. The paired extended portions of coil end plates 24, 25, 26 laminated on the other end surface of the stator core 10 are electrically connected with the paired leg portions of coil segments 21, 22, 23 (refer to FIGS. 4A to 4C) by fastening members 31 (refer to FIG. 9B). Incidentally, instead of fastening by fastening members 31, fixing may be carried out by crimp fitting, welding, brazing, or the like.

The number of layers of lamination of coil end plates 24, 25, 26 on the other end surface of the stator core 10 is a number obtained by multiplication between the number of coil turns (the number of turns of a coil loop) and the number of phases of currents. Herein, for the stator 1 according to the present embodiment, as the number of coil turns is three and the number of phases of currents is three, the number of layers of lamination of coil end plates 24, 25, 26 is nine, as shown in FIG. 12.

On the other end surface of the stator core 10, coil end plates are arranged such that the kind of coil end plates is all the same along the circumferential direction of the stator core 10. That is, in case that nine layers of coil end plates are, as described above, laminated on the end surface of the stator core 10, coil end plates in the same shape (kind) are arranged on respective layers, in such a manner that, for example as shown in FIG. 12, coil end plates 26 are disposed on the first to third layers, coil end plates 25 are disposed on the fourth to sixth layers, and coil end plates 24 are arranged on the seventh to ninth layers.

Further, as described above, the pairs of extended portions (the first extended portions) of coil end plates are formed longer in the order of coil end plate 24, coil end plate 25, and coil end plate 26 (refer to FIGS. 10A to 10C). Consequently, when the coil end plates are laminated in the order shown in FIG. 12, the pairs of extended portions are disposed shifted from each other along the radial direction of the stator core 10, wherein the lower a layer is, coil end plates with the longer (along the radial direction of the stator core 10) pairs of extended portions are disposed. In other words, coil end plates 24, 25, 26 are, as shown in FIG. 12, laminated on the end surface of the stator core 10 in step-formed (or mortar shape) lamination such that the paired extended portions are shifted from each other, corresponding to the layers, along the radial direction of the stator core 10. For the stator 1 according to the present embodiment, as the paired extended portions are thereby shifted from each other along the radial direction of the stator core 10, corresponding to the layers, the extended portions (the second extended portions) of coil end plates 24, 25, 26 do not overlap with the extended portions of other coil end plates 24, 25, 26. In such a manner, the area occupation ratio of coils can be increased by the use of coil end plate 21, 22, 23. Further, the volume of the crossover portions of coils on the other end surface of the stator core 10 can be reduced by the use of coil end plate 24, 25, 26. Still further, a space for fastening by fastening members 31 can be ensured in laminating coil end plates 24, 25, 26.

Further, for the stator 1 according to the present embodiment, as shown in FIG. 12, as coil end plates 24, 25, 26 in a plate shape are laminated as coil end members, the height h of the coil end portion can be reduced to the minimum limit. For the stator 1, as coil end plates 24, 25, 26 are laminated in a step form, heat generated by current flow in the coil end plates 24, 25, 26 easily transfers to the stator core 10, and the cooling efficiency is thereby improved.

Herein, in the coil end plates 24, 25, 26 laminated on the other end surface of the stator core 10, currents in the same phases flow, corresponding to the respective layers. That is, in case that coil end plates are laminated on nine layers on the end surface of the stator core 10, U-phase, V-phase, and W-phase are disposed as described above such as to make the resistance values of coils in which currents in the respective same phases corresponding to the layers flow be equal to each other, for example, as shown in FIG. 12, V-phase for the first layer, U-phase for the second layer, W-phase for the third layer, U-phase for the fourth layer, W-phase for the fifth layer, V-phase for the sixth layer, W-phase for the seventh layer, V-phase for the eighth layer, and U-phase for the ninth layer. Further, the lengths of coil segments are made equal corresponding to the respective phases. In FIG. 12, sand hatching represents coil end plates 24, 25, 26 in which current in U-phase flows, cross hatching represents coil end plates in which current in V-phase flow, and dot hatching represents coil end plates 24, 25, 26 in which current in W-phase flows.

Figure 13:
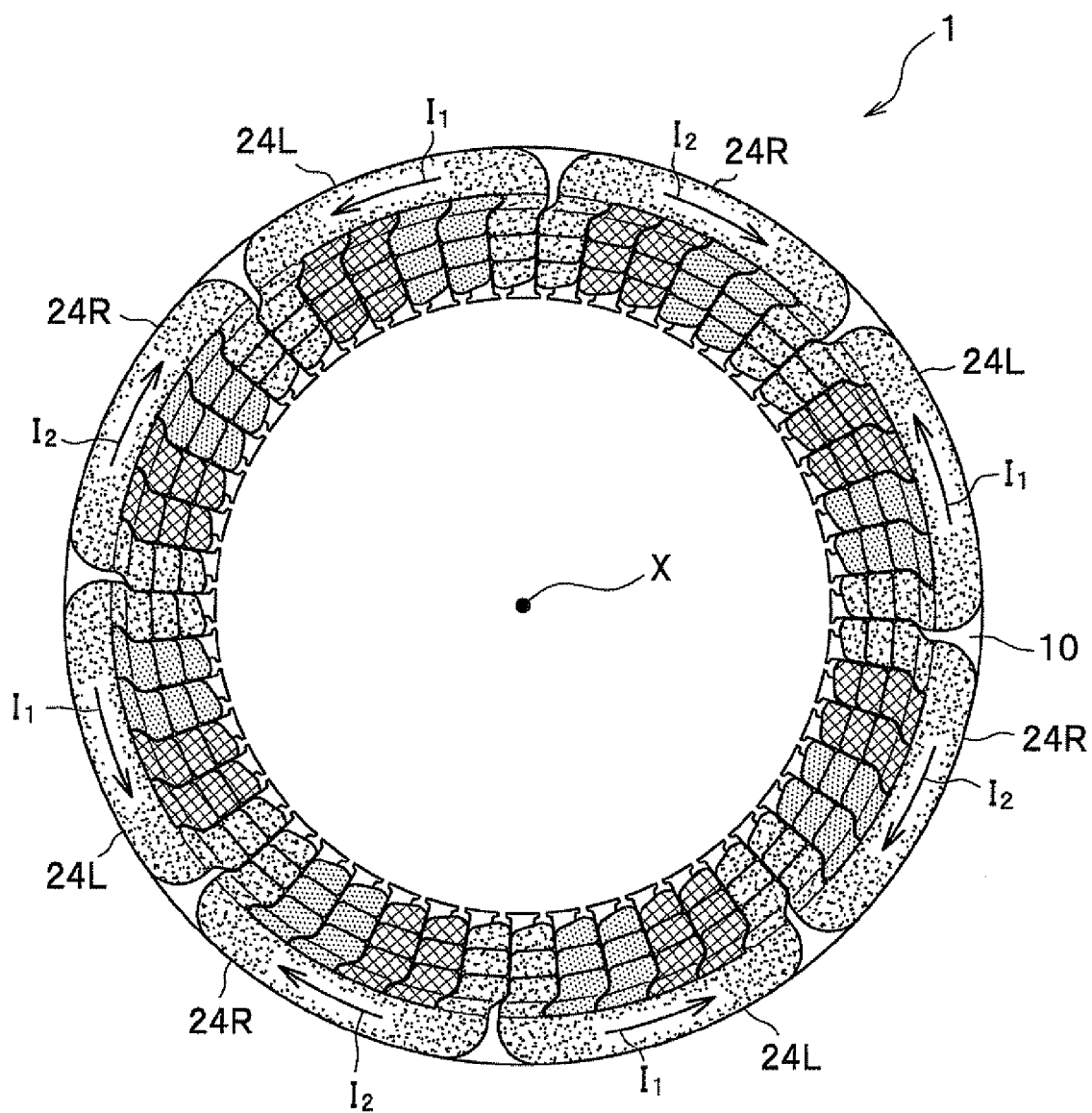
FIG. 13 is a diagram showing the whole structure of the stator for a rotary electric machine, according to the embodiment, and is a plan view in a state that the side on which the coil end plates are arranged faces upward.

The coil end plates 24, 25, 26 are, as shown in FIG. 13, disposed along the circumferential direction of the stator core 10 in a plural number such as to form circular annular shapes, corresponding to the respective layers, in a plan view of the stator 1 from the other end surface side (from above). Further, as described above, the coil end plates 24, 25, 26 are laminated in a step-form (refer to FIG. 12) on the other end surface of the stator core 10, and accordingly, the lower a layer where coil end plate 24, 25, 26 are disposed is, the smaller the radius of a circular annular shape, in which the extended portions of the coil end plates 24, 25, or 26 are disposed, is. Thus, for the stator 1 according to the present embodiment, as shown in FIG. 13, coil end plates 24, 25, 26 can be laminated on the other end surface of the stator core 10 in a state that the paired second extended portions (hole portions) thereof are exposed. In such a manner, the area occupation ratio of coils can be increased by the use of coil end plate 21, 22, 23. Further, the volume of the crossover portions of coils on the other end surface of the stator core 10 can be reduced by the use of coil end plate 24, 25, 26. Still further, a space for fastening by fastening members 31 can be ensured in laminating coil end plates 24, 25, 26.

Further, the stator 1 according to the present embodiment, as show in FIG. 13, is arranged such that the paired second extended portions (hole portions) of all coil end plates 24, 25, 26 can be easily viewed from outside. Therefore, fastening task by fastening members 31 can be easily carried out, and for example, the number of coil turns, the positions of coil end plates 24, 25, 26, and the like can be easily changed in assembling, which attains excellent assembly and maintainability.

Herein, in the coil end plates 24, 25, or 26 disposed along the circumferential direction of the stator core 10 on the other end surface of the stator core 10, a current in the same direction flows alternately, in other words, in every other coil end plate. That is, when the coil end plate 24, 25, 26 are disposed, as described above, in a circular annular shape on the end surface of the stator core 10, for example as shown in FIG. 13, a clockwise current $I_1$ flows, with the rotation axis X of the rotary electric machine as the center, in the respective coil end plates 24R on the uppermost layer, and a counterclockwise current $I_2$ flows, with the rotation axis X of the rotary electric machine as the center, in the respective coil end plates 24L on the uppermost layer. This also occurs similarly to other coil end plates 24, 25, 26 laminated below the uppermost layer. In such a manner, for the stator 1 according to the present embodiment, currents in opposite directions flow alternately in the coil end plates 24, 25, 26 neighboring each other. In FIG. 13, sand hatching represents coil end plates 24, 25, 26 in which current in U-phase flows, cross hatching represents coil end plates in which current in V-phase flow, and dot hatching represents coil end plates 24, 25, 26 in which current in W-phase flows.

Rest of Structure of Stator Coil 20

The rest of the structure of the stator coil 20 will be described below in detail. In addition to the coil segments and the coil end plates having been described above, the stator coil 20 is, as shown in FIG. 14, provided with left-right reverse coil segments 27, power supply segments 28, a midpoint-short-circuit coil segment 29, and midpoint connection coil segments 30.

Figure 14:
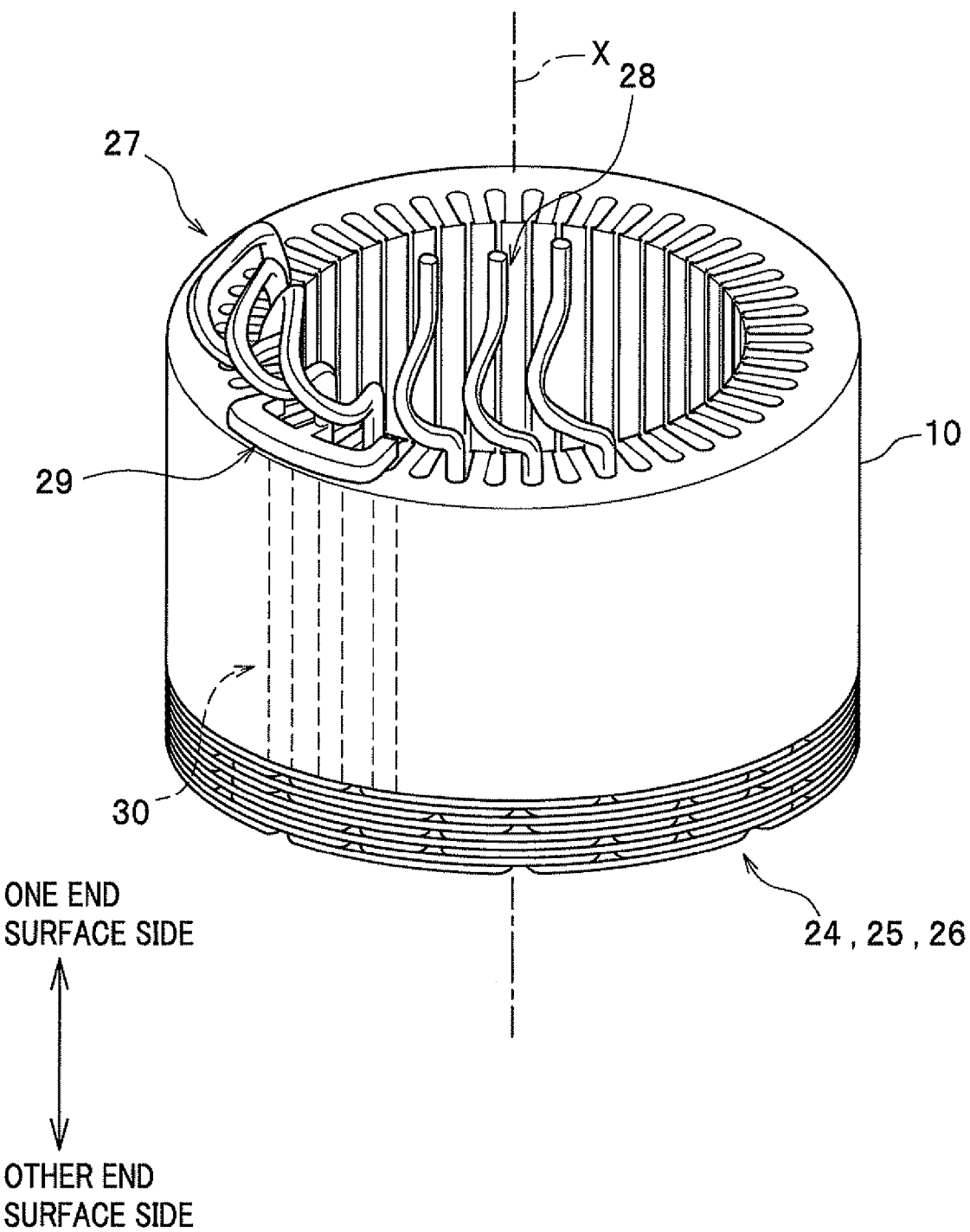
FIG. 14 is a diagram showing the structure of a part of the stator for a rotary electric machine, according to the embodiment, and is a perspective view showing a state that all coil segments are removed.

A left-right reverse coil segment 27 reverses the direction of a current flowing in coil segments 21, 22, 23, as shown in FIG. 14. A left-right reverse coil segment 27 is formed, for example, by a conductive bar-shaped member of copper, copper alloy, aluminum, aluminum alloy, or the like, and has a shape bent substantially in a U-shape, as shown in FIG. 14. However, the material for a left-right reverse coil segment 27 is not particularly limited as long as the material is excellent in conductivity and formability.

Reversing the direction of a current concretely refers to changing the direction of a coil loop formed for the stator coil 20. That is, for the stator 1 according to the present embodiment, as described later, coil segments 21, 22, 23 and coil end plates 24, 25, 26 are used to form coil turns along the radial direction and the circumferential direction of the stator core 10 so that two coil loops, namely, a clockwise coil loop and a counterclockwise coil loop with the rotation axis X of the rotary electric machine as the center, are formed (refer to FIG. 20 described later). Further, a left-right reverse coil segment 27 is electrically connected with a coil end plate that forms the end point of the clockwise coil loop and a coil end plate that forms the start point of the counterclockwise coil loop, and is thereby used for switching between the clockwise coil loop and the counterclockwise coil loop. Coil loops formed for the stator 1 will be described later in detail (refer to FIG. 20 described later).

Figure 15:
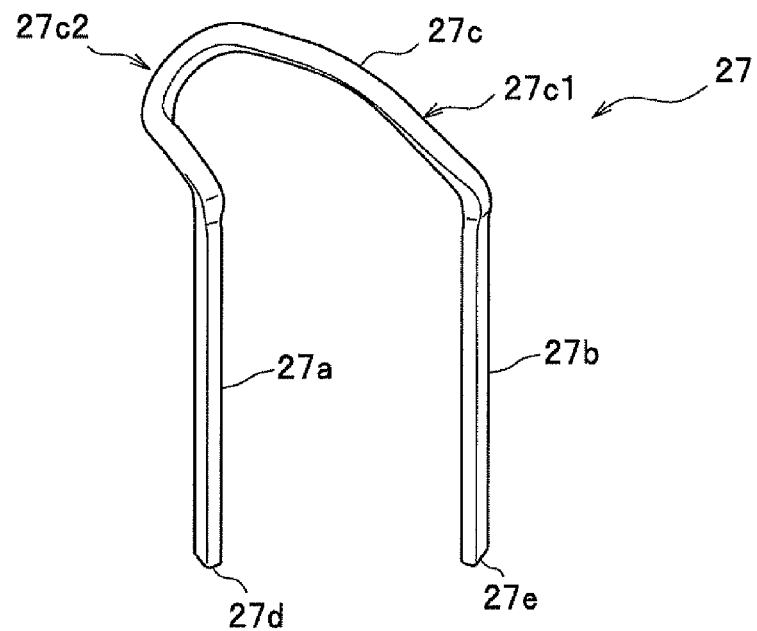
FIG. 15 is a perspective view showing the structure of a left-right reverse coil segment that partially forms the stator coil of the stator for a rotary electric machine, according to the embodiment.

A left-right reverse coil segment 27 has, as shown concretely in FIG. 15, a pair of leg portions 27a, 27b formed in a linear shape and a curved portion 27c in a curved shape continuously formed between one (the first) leg portion 27a and the other (the second) leg portion 27b. The curved portion 27c is, as shown in FIG. 14, exposed on the one end surface side of the stator core 10, in a state that the left-right reverse coil segment 27 is received by slots 11 of the stator core 10. Further, the respective end portions 27d, 27e of the paired leg portions 27a, 27b are provided with a hole portion with a certain depth, not shown, into which a fastening member 31 (refer to FIG. 9B), for example, is inserted when the left-right reverse coil segment 27 is connected with coil end plates 24, 25, or 26. Although, in the above example, hole portions for fastening by fastening members 31 are formed for a left-right reverse coil segment 27, hole portions may be not formed in case of joining by a method, such as welding.

Herein, the curved portion 27c of the left-right reverse coil segment 27 has, as shown more concretely in FIG. 15, a first curved portion 27c1 and a second curved portion 27c2. As shown in FIG. 15, the first curved portion 27c1 is continuously formed from the other leg portion 27b, and the second curved portion 27c2 is continuously formed from the first curved portion 27c1 to the one leg portion 27a.

In a plan view, the first curved portion 27c1 is formed such as to curve toward the inner diameter side of the stator core 10, and the second curved portion 27c2 is formed such as to curve toward the inner diameter side, of the stator core 10, at a different slot 11. One side surface (the side surface on the inner diameter side of the stator core 10) of the first curved portion 27c1 is formed such as not to enter inside the inner diameter of the stator core 10. One side surface of the second curved portion 27c2 is formed such as to be along the other side surface (the side surface on the outer diameter side of the stator core 10) of the second curved portion 22c2 of the coil segment 22 received in different slots 11. The other side surface of the first curved portion 27c1 is formed such as to be along the one side surface of the first curved portion 22c1 of the coil segment 22 received in different slots 11. The other side surface of the second curved portion 27c2 is formed such as to be within the outer diameter of the stator core 10 (refer to FIG. 1).

The first curved portion 27c1 and the second curved portion 27c2 are, in a front view, formed such as to curve toward the one end surface side (the upper side) of the stator core 10. The lower surface (the surface on the other end surface side of the stator core 10) of the first curved portion 27c1 is formed such as to be along the upper surface (the surface on the one end surface side of the stator core 10) of the first curved portion 22c1 of the coil segment 22 received in different slots 11. The lower surface of the second curved portion 27c2 is formed such as to be along the upper surface of the second curved portion 22c2 of the coil segment 22 received in different slots 11. The upper surface of the second curved portion 27c2 is formed such as to be along the lower surface of the second curved portion 22c2 of the coil segment 22 received in different slots 11 (refer to FIG. 1).

In such a manner, the first curved portion and the second curved portion of the coil segments 22 received in different slots 11 are disposed on the lower surface of the first curved portion 27c1 and the lower and upper surfaces of the second curved portion 27c2, along the first curved portion 27c1 and the second curved portion 27c2 without a gap. By a left-right reverse coil segment 27 having a curved portion 27c with such a structure, coil segments 22 received in different slots 11 can be disposed, without a waste, neighboring each other in the radial direction and the rotation axis X direction.

A left-right reverse coil segment 27 is, as shown in FIG. 15, formed in a shape having legs which are open with a certain distance between the legs. Thus, the pair of leg portions of the left-right reverse coil segment 27 are received in two respective different slots 11 of the stator core 10, as shown in FIG. 14.

The distance between the paired leg portions of the left-right reverse coil segment 27 is formed in the following manner, as concretely shown in FIG. 14. That is, while one leg portion 27a is received in a slot 11 of the stator core 10, the other leg portion 27b is received in the slot 11 that is the sixth one (the sixth with respect to the circumferential direction of the stator core 10) from the slot 11 receiving the one leg portion 27a. However, the open distance between the paired leg portions of the left-right reverse coil segment 27 is not particularly limited, and can be changed, as appropriate, corresponding to the number of phases of currents supplied from outside. The distance between the paired leg portions of the left-right reverse coil segment 27 is larger than the distance between the paired leg portions of a coil segment 21, 22, and smaller than the distance between the paired leg portions of a coil segment 23, because the direction of current is reversed by connecting the left-right reverse coil segment 27 with coil end plates 24, 25, 26 that form neighboring coil loops.

Though not shown, similarly to the case of the above-described coil segments 21, 22, 23, three kinds of left-right reverse coil segments 27 with different lengths of paired leg portions are used, corresponding to the number of phases of currents supplied from outside. Thereby, for the stator 1 according to the present embodiment, even in case that currents in plural phases are supplied from outside; the number of lamination layers of coil end plates 24, 25, 26 laminated on the other end surface side of the stator core 10 increases, corresponding to the number of phases of the currents; and the distances between left-right reverse coil segments 27 and the coil end plates 24, 25, 26 are accordingly extended with the stator core 10 therebetween, it is possible to adjust the lengths of the leg portions of left-right reverse coil segments 27, corresponding to the extended distances. For the stator 1, it is thereby possible to easily connect coil end plates and left-right reverse coil segments 27 disposed on each layer and thus improve the assembly.

A left-right reverse coil segment 27 having such a structure is, as shown in FIG. 14, inserted into two different slots 11 from the one surface side of the stator core 10. More concretely, the left-right reverse coil segment 27 is received by two slots 11 in a state that, in each slot 11, either of the paired leg portions thereof and two leg portions out of the paired leg portions of coil segments 21, 22, 23 (in other words, respective one leg portions of two coil segments out of the coil segments 21, 22, 23) are lapped in a certain order along the radial direction of the stator core 10. Further, the respective end portions of the leg portions of the left-right reverse coil segment 27 and the respective end portions of the leg portions of the coil segments 21, 22, 23 received in the slots 11 are electrically connected with the second extended portions of coil end plates 24, 25, 26 (refer to FIG. 10) by fastening members 31 (refer to FIG. 9B) on the other end surface side of the stator core 10. Incidentally, instead of fastening by fastening members 31, fixing may be carried out by crimp fitting, welding, brazing, or the like.

A power supply coil segment 28 is, as shown FIG. 14, used to supply current from an external power source to coil segments 21, 22, 23 and a left-right reverse coil segment 27. A power supply coil segment 28 is formed, for example, by a conductive bar-shaped member of copper, copper alloy, aluminum, aluminum alloy, or the like, and has a linear shape which is partially curved, as shown in FIG. 14. However, the material for a power supply coil segment 28 is not particularly limited as long as the material is excellent in conductivity and formability.

Figure 16:
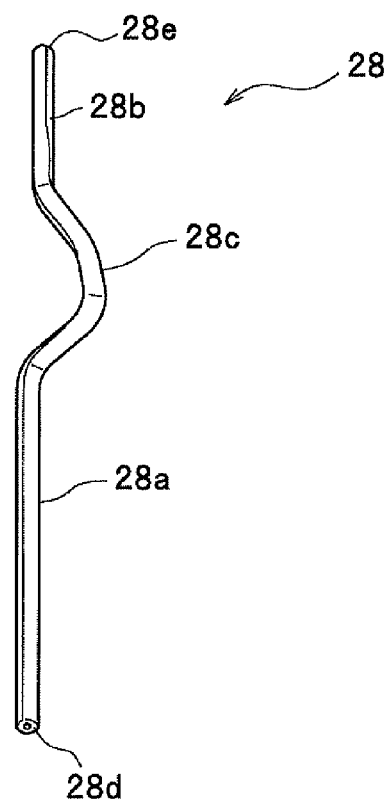
FIG. 16 is a perspective view showing the structure of a power supply coil segment that partially forms the stator coil of the stator for a rotary electric machine, according to the embodiment.

A power supply coil segment 28 has, as concretely shown in FIG. 16, a pair of linearly shaped leg portions 28a, 28b and a curved portion 28c in a curve shape continuously formed between one (the first) leg portion 28a and the other (the second) leg portion 28b. The curved portion 28c is, as shown in FIG. 14, exposed on the one end surface side of the stator core 10 in a state that the power supply coil segment 28 is received by a slot 11 of the stator core 10. Further, the curved portion 28c is formed such as to be along the curved portions of coil segments received in neighboring slots 11, and is formed such that the curved portion 28c can be exposed on the one end surface side of the stator core 10 (refer to FIG. 1). Further, the end portion 28d of the leg portion 28a is provided with a hole portion with a certain depth, not shown, into which a fastening member 31 (refer to FIG. 9B), for example, is inserted when the power supply coil segment 28 is connected with coil end plates 24, 25, or 26. Although, in the above example, a hole portion for fastening by a fastening member 31 is formed for a power supply coil segment 28, a hole portion may be not formed in case of joining by a method, such as welding.

Though not shown, similarly to the case of the above-described coil segments 21, 22, 23, three kinds of power supply coil segments 28 which are different from each other in the lengths of a pair of leg portions are used, corresponding to the number of phases of currents supplied from outside. Thereby, for the stator 1 according to the present embodiment, even in case that currents in plural phases are supplied from outside; the number of lamination layers of coil end plates 24, 25, 26 laminated on the other end surface side of the stator core 10 increases, corresponding to the number of phases of the currents; and the distances between the power supply coil segments 28 and the coil end plates 24, 25, 26 are accordingly extended with the stator core 10 therebetween, it is possible to adjust the lengths of the leg portions of the power supply coil segments 28, corresponding to the extended distances. For the stator 1, it is thereby possible to easily connect coil end plates and the power supply coil segments 28 disposed on each layer and thus improve the assembly.

A power supply coil segment 28 having such a structure is, as shown in FIG. 14, inserted into a slot 11 from the one surface side of the stator core 10. More concretely, the power supply coil segment 28 is received by a slot 11 of the stator core 10 in a state that the one leg portion 28a thereof and two leg portions out of the paired leg portions of coil segments 21, 22, 23 (in other words, respective one leg portions of two coil segments out of the coil segments 21, 22, 23) are lapped in the slot 11 in a certain order along the radial direction of the stator core 10. Further, the respective end portions of the leg portions of the power supply coil segment 28 and the coil segments 21, 22, 23 received in the slot 11 are electrically connected with the second extended portions of coil end plates 24, 25, 26 (refer to FIG. 10) by fastening members 31 (refer to FIG. 9B) on the other end surface side of the stator core 10. The other leg portion 28b of the power supply coil segment 28 is, as shown in FIG. 14, exposed on the one end surface side of the stator core 10 and connected with an external power source at the end portion thereof. Incidentally, the end portions of the respective leg portions of the power supply coil segment 28 and the coil segments 21, 22, 23 may be fixed by crimp fitting, welding, brazing, or the like instead of fastening by fastening members 31.

A midpoint-short-circuit coil end plate 29 is, as shown in FIG. 14, used to short circuit, at midpoint, currents in plural phases supplied from outside to the groups of coil segments and the groups of coil end plates. The midpoint-short-circuit coil end plate 29 is formed, for example, by a conductive plate-shaped member of copper, copper alloy, aluminum, aluminum alloy, or the like, and has a shape with three protrusions, as shown in FIG. 14. However, the material for the midpoint-short-circuit coil end plate 29 is not particularly limited as long as the material is excellent in conductivity and formability.

Figure 17:
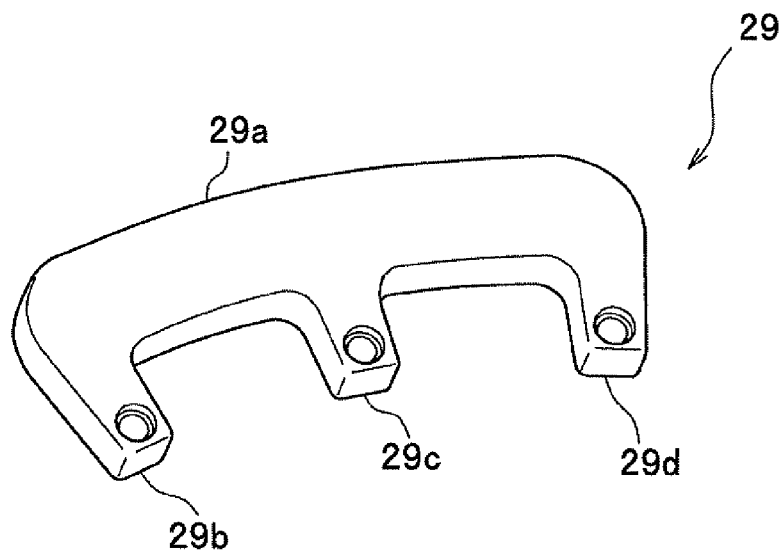
FIG. 17 is a perspective view showing the structure of a midpoint-short-circuit coil end plate that partially forms the stator coil of the stator for a rotary electric machine, according to the embodiment.

The midpoint-short-circuit coil end plate 29 has, as shown concretely in FIG. 17, a plate portion 29a formed in a flat plate shape and three extended portions 29b, 29c, 29d extended from one end side of the plate portion 29a. The extended portions 29b, 29c, 29d are, as shown in FIG. 17, provided with respective hole portions into which fastening members (refer to FIG. 9B) are inserted when the midpoint-short-circuit coil end plate 29 and midpoint connection coil segments 30 are connected. The midpoint-short-circuit coil end plate 29 and the midpoint connection coil segments 30 can also be formed in one body.

The plate portion of the midpoint-short-circuit coil end plate 29 is, as shown in FIGS. 14 and 17, formed such as to extend along the circumferential direction of the stator core 10 and curve along the shape of the end surface of the stator core 10, wherein the midpoint-short-circuit coil end plate 29 is disposed on the end surface of the stator core 10.

The extended portions of the midpoint-short-circuit coil end plate 29 are, as shown in FIGS. 14 and 17, formed such as to extend along the radial direction of the stator core 10, wherein the midpoint-short-circuit coil end plate 29 is disposed on the end surface of the stator core 10. The extended portions of the midpoint-short-circuit coil end plate 29 are, as shown in FIG. 17, extended in a plural number (herein three) from one end side of the plate portion 29a. The number of the extended portions of the midpoint-short-circuit coil end plate 29 corresponds to the number of phases of currents supplied form outside. In case that currents in three phases are supplied from outside as in the case of the stator 1 according to the present embodiment, a midpoint-short-circuit coil end plate 29 having three extended portions is used.

The extended portions of the midpoint-short-circuit coil end plate 29 are, as shown in FIG. 17, extended from one end side of the plate portion 29a with a certain distance therebetween. Thereby, the extended portions of the midpoint-short-circuit coil end plate 29 are, as shown in FIG. 14, electrically connected with the leg portions of midpoint connection coil segments 30 which are received by three different slots 11 of the stator core 10.

The distance between the extended portions of the midpoint-short-circuit coil end plate 29 is, as concretely shown in FIG. 14, formed such that each one slot 11 is positioned between the extended portions 29d, 29c, 29d, wherein the midpoint-short-circuit coil end plate 29 is disposed on the one end surface of the stator 1.

The midpoint-short-circuit coil end plate 29 having such a structure is, as shown in FIG. 14, disposed on the one end surface side of the stator core 10 where the curved portions of coil segment 21, 22, 23 are exposed. The extended portions of the midpoint-short-circuit coil end plate 29 disposed on the end surface of the stator core 10 are electrically connected by fastening members 31 (refer to FIG. 9B) with the end portions of the leg portions (refer to FIG. 18 described later) of the midpoint connection coil segments 30 received by slots 11 of the stator 1. A midpoint connection coil segment 30 is electrically connected with a coil end plate 24, 25, 26 that forms the last coil loop of plural coil loops formed for the stator 1. In the present embodiment, the midpoint-short-circuit coil end plate 29 is electrically connected through a midpoint connection coil segment 30 with each coil end plate 24 or the like that forms the individual last coil loop. The extended portions of the midpoint-short-circuit coil end plate 29 may be fixed by crimp fitting, welding, brazing, or the like instead of fastening by fastening members 31.

The midpoint connection coil segments 30 are, as shown in FIG. 14, used to electrically connect the midpoint-short-circuit coil end plate 29 and these coil end plates 24. A midpoint connection coil segment 30 is formed, for example, by a conductive bar-shaped member of copper, copper alloy, aluminum, aluminum alloy, or the like, and has a linear shape, as shown in FIG. 14. However, the material for a midpoint connection coil segment 30 is not particularly limited as long as the material is excellent in conductivity and formability.

Figure 18:
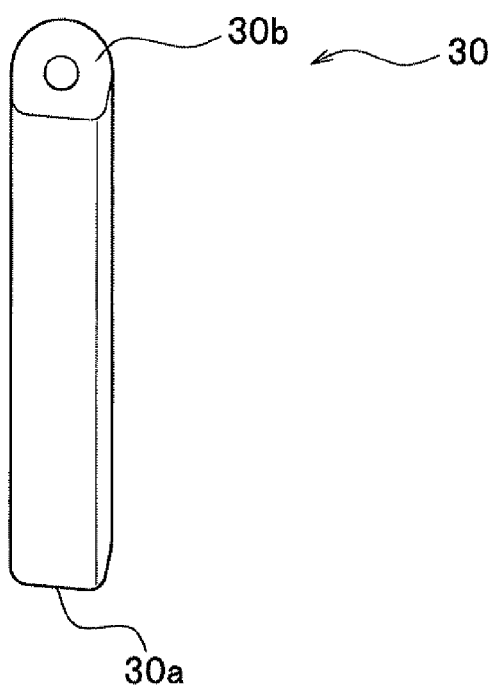
FIG. 18 is a perspective view showing the structure of a midpoint connection coil segment that partially forms the stator coil of the stator for a rotary electric machine, according to the embodiment.

A midpoint connection coil segment 30 is, as shown in FIG. 18, linearly formed, wherein the end portions of one (the first) leg portion 30a and the other (the second) leg portion 30b are provided with a hole portion with a certain depth into which, for example, a fastening member 31 (refer to FIG. 9B) is inserted when the midpoint connection coil segment 30 is connected with the midpoint-short-circuit coil end plate 29. Although the midpoint connection coil segments 30 are provided with hole portions, in the above-described example, for fastening by fastening members 31, hole portions may be not formed in a case of joining by a method, such as welding or the like.

Though not shown, similarly to the case of the above-described coil segments 21, 22, 23, three kinds of midpoint connection coil segments 30 with different lengths of paired leg portions are used, corresponding to the number of phases of currents supplied form outside. Thereby, for the stator 1 according to the present embodiment, even in case that currents in plural phases are supplied from outside; the number of lamination layers of coil end plates 24, 25, 26 laminated on the other end surface side of the stator core 10 increases, corresponding to the number of phases of the currents; and the distances between the midpoint connection coil segments 30 and the coil end plates 24, 25, 26 are accordingly extended with the stator core 10 therebetween, it is possible to adjust the lengths of paired leg portions of the midpoint connection coil segments 30 corresponding to the extended distances. For the stator 1, it is thereby possible to easily connect coil end plates and the midpoint connection coil segments 30 disposed on each layer and thus improve the assembility.

A midpoint connection coil segment 30 having such a structure is, as shown in FIG. 14, inserted into a slot 11 of the stator core 10. The end portion of the one leg portion 30a of the midpoint connection coil segment 30 received by the slot 11 is electrically connected, on the other end surface side of the stator core 10, by a fastening member 31 (refer to FIG.

9B), with one of the second extended portions (refer to FIG. 10A) of a coil end plate 24 that forms the last coil loop of plural coil loops formed for the stator 1. Further, the end portion of the other leg portion 30b of the midpoint connection coil segment 30 is, as shown in FIG. 14, electrically connected, on the one end surface side of the stator core 10, by a fastening member 31 (refer to FIG. 9B), with one of the extended portions (refer to FIG. 17) of the midpoint-short-circuit coil end plate 29. The paired leg portions 30a, 30b of the midpoint connection coil segment 30 may be fixed by crimp fitting, welding, brazing, or the like instead of fastening by fastening members 31.

For the stator 1 having a structure as has been described above according to the present embodiment, plural coil segments 21, 22, 23 are received by a slot 11 of the stator core 10, the plural coil segments 21, 22, 23 are electrically connected with each other at the end portions thereof through plate-shaped coil end plates 24, 25, 26, and it is thereby possible to easily form a coil loop around the rotation axis X, without extending coil end portions along the rotation axis X direction of the rotary electric machine.

For the stator 1 according to the present embodiment, as coil loops are formed, based on rough categorization, by two kinds of members, which are coil segments 21, 22, 23 each of which is formed in a U-shape, and coil end plates 24, 25, 26, it is possible to minimize portions which require physical connection and improve the assembly. Further, as coil end plates 24, 25, 26 in a plate shape are used as coil end members of the stator 1, the height of the coil end portions on an end surface of the stator core 10 can be reduced. Accordingly, even if rigid conductors are used for coil loops, the volume of the coil end portions can be reduced while satisfactory lap winding is carried out, and downsizing of a whole device can thereby be realized.

Operation of Stator 1

The operation of the stator 1 according to the present embodiment, namely, the details of coil turns and coil loops formed for the stator 1 will be described below, referring to FIGS. 19 and 20.

First, coil turns will be described below, referring to FIG. 19. FIG. 19 shows two coil turns formed by coil segments neighboring each other and coil end plates. These two coil turns are, as shown in FIG. 19, a clockwise coil turn (the left side in the figure) and a counterclockwise coil turn (the right side in the figure). Such clockwise and counterclockwise coil turns are, as shown in FIG. 19, formed in respective plural numbers along the radial direction and the circumferential direction of the stator core 10, corresponding to the number of combination between coil segments 21, 22, 23, which are inserted in the same or different slots 11 of the stator core 10, and corresponding coil end plates 24, 25, 26. With these plural coil turns formed along the radial direction and the circumferential direction of the stator core 10, currents flow, as shown in FIG. 19, in current paths neighboring each other along the circumferential direction of the stator core 10, in the respective directions which are opposite to each other.

The clockwise coil turns, as shown in FIG. 19, are current paths formed by coil segments 21R, 22R, 23R and coil end plates 24R, 25R, 26R. Concretely, as shown in FIG. 19, corresponding ones of the paired leg portions of the coil segment 22R and the coil segment 21R are lapped along the radial direction of the stator core 10. The other (on the right side) leg portion of the coil segment 22R, the other (on the right side) leg portion of the coil segment 21R, and the one (on the left side) leg portion of the coil segment 23R are lapped along the radial direction of the stator core 10.

As shown in FIG. 19, the one (the left side) leg portion of the coil segment 21R is connected with the other (the left side) extended portion of the coil end plate 24R, and the other (the right side) leg portion of the coil segment 21R is connected with the one (the right side) extended portion of the coil end plate 25R. Further, as shown in FIG. 19, the one (the left side) leg portion of the coil segment 22R is connected with the other (the left side) extended portion of the coil end plate 25R, and the other (the right side) leg portion of the coil segment 22R is connected with the other (the right side) extended portion of the coil end plate 26R. Still further, as shown in FIG. 19, the one (the left side) leg portion of the coil segment 23R is connected with the one (the right side) extended portion of the coil end plate 24R. Though not shown, the other (the right side) leg portion of the coil segment 23R is connected with the one (the left side) extended portion of a coil end plate 26R that is disposed next to and on the right side of the coil end plates 24L, 25L, 26L.

If a current $I_1$ is, as shown in FIG. 19, supplied to the end portion of the other leg portion of the coil segment 23R, the end portion being the start point of the clockwise coil turns, then the current $I_1$ proceeds in the order of the coil segment 23R, the coil end plate 24R, the coil segment 21R, the coil end plate 25R, the coil segment 22R, and the coil end plate 26R. Thus, the current $I_1$ circulates along the radial direction of the stator core 10, and clockwise coil turns are formed.

The counterclockwise coil turns, as shown in FIG. 19, are current paths formed by coil segments 21L, 22L, 23L and coil end plates 24L, 25L, 26L. Concretely, as shown in FIG. 19, corresponding ones of the paired leg portions of the coil segment 22L and the coil segment 21L are lapped along the radial direction of the stator core 10, and further, the other leg portion of the coil segment 22L, the other leg portion of the coil segment 21L, and the one leg portion of the coil segment 23L are lapped along the radial direction of the stator core 10.

As shown in FIG. 19, the one (the left side) leg portion of the coil segment 21L is connected with the other (the left side) extended portion of the coil end plate 24L, and the other (the right side) leg portion of the coil segment 21L is connected with the one (the right side) extended portion of the coil end plate 25L. Further, as shown in FIG. 19, the one (the left side) leg portion of the coil segment 22L is connected with the other (the left side) extended portion of the coil end plate 25L, and the other (the right side) leg portion of the coil segment 22L is connected with the other (the right side) extended portion of the coil end plate 26R. Still further, as shown in FIG. 19, the one (the left side) leg portion of the coil segment 23L is connected with the one (the right side) extended portion of the coil end plate 24L. Though not shown, the other (the right side) leg portion of the coil segment 23L is connected with the one (the left side) extended portion of a coil end plate 26L that is disposed second next to and on the right side of the coil end plates 24L, 25L, 26L.

If a current $I_2$ is, as shown in FIG. 19, supplied to the other extended portion of the coil end plate 26L, the other extended portion being the start point of the counterclockwise coil turns, then the current $I_2$ proceeds in the order of the coil end plate 26L, the coil segment 22L, the coil end plate 25L, the coil segment 21L, the coil end plate 24L, and the coil segment 23L. Thus, the current $I_2$ circulates along the radial direction of the stator core 10, and counterclockwise coil turns are formed.

Such clockwise and counterclockwise coil turns are formed in plural numbers respectively along the radial direction and the circumferential direction of the stator core. As shown in FIG. 19, clockwise coil turns go leftward as a whole with the rotation axis X of the rotary electric machine as the center, and thereby forms a counterclockwise coil loop. As shown in FIG. 19, counterclockwise coil turns go rightward as a whole with the rotation axis X of the rotary electric machine as the center, and thereby forms a clockwise coil loop.

Herein, for the stator 1 according to the present embodiment, concretely, three turns are formed between certain slots respectively as clockwise coil turns and counterclockwise coil turns. Further, four turns are formed along the circumferential direction of the stator core 10 respectively as clockwise coil turns and counterclockwise coil turns (totally eight turns) for each phase of current supplied from outside.

Coil loops will be described below, referring to FIG. 20. FIGS. 20A and 20B show a whole coil loop formed for the stator, wherein FIG. 20A shows a coil loop formed for the stator 1 according to the present embodiment, and FIG. 20B shows a coil loop formed for a conventional stator. In FIGS. 20A and 20B, for brevity of description, in the following description, the number of coil turns along the radial direction of the stator core is assumed to be three, and the number of coil turns along the circumferential direction of the stator core 10 is assumed to be four. Further, description will be made on assumption that the right end and the left end in FIGS. 20A and 20B are closed.

As shown in FIG. 20A, on the stator 1 according to the present embodiment, if a current, for example, in W-phase is supplied from outside, this current clockwise circuits the coil turn represented by '1' three times, then proceeds leftward, and clockwise circuits the coil turn that is the second next on the left side and represented by '2' three times. Subsequently, as shown in FIG. 20A, the direction of the current is switched at the end point of the coil turn represented by '2', then the current counterclockwise circuits the coil turn represented by '3' three times, thereafter proceeds rightward, counterclockwise circuits the coil turn that is the second next on the left side and represented by '4' three times, and is output to outside. That is, on the stator 1 according to the present embodiment, as shown in FIG. 20A, a current first circuits all clockwise coil turns, and then circuits all counterclockwise coil turns in the order '1 (clockwise)', '2 (clockwise)', '3 (counterclockwise)', and '4 (counterclockwise)'.

On the other hand, as shown in FIG. 20B, on a conventional ordinary stator, for example, if a current in W-phase is supplied from outside, the current clockwise circuits the coil turn represented by '1' three times, then proceeds leftward, and counterclockwise circuits the coil turn that is the next on the left side and represented by '2' three times. Subsequently, as shown in FIG. 20B, the current clockwise circuits the coil turn represented by '3' three times, thereafter proceeds leftward, counterclockwise circuits the coil turn that is the next on the left side and represented by '4' three times, and is output to outside. That is, on a conventional ordinary stator, as shown in FIG. 20B, a current alternately circuits clockwise coil turns and counterclockwise coil turns in the order '1 (clockwise)', '2 (counterclockwise)', '3 (clockwise)', and '4 (counterclockwise)'.

Herein, as shown in FIG. 20B, if a coil loop is formed such that a current alternately circuits clockwise and counterclockwise, as shown in part G in FIG. 20B, a cross point where three coils are overlapped is formed when the direction of the current is switched between clockwise circuit and counterclockwise circuit, and consequently, the area occupation ratio of coils decreases. On the other hand, as shown in FIG. 20A, if a coil loop is formed such that a current first makes all clockwise circuits and subsequently makes all counterclockwise circuits, as the number of generated cross points can be reduced to the minimum, the area occupation ratio of coils improves, compared with a conventional case.

Further, for the stator 1 according to the present embodiment, as shown in FIG. 20A, clockwise (counterclockwise) coil turns are formed such as to avoid intersection between neighboring coil turns along the circumferential direction of the stator core 10. Thus, for the stator 1 according to the present embodiment, generation of cross points caused by intersection between neighboring coil turns can be reduced, and the area occupation ratio of coils can be thereby improved.

Although a stator for a rotary electric machine according to the present invention has been concretely described with an embodiment for carrying out the invention, the spirit of the invention is not limited thereto and should be broadly interpreted, based on the descriptions set forth in the claims. Further, it is needless to say that various changes and modifications, based on the descriptions are included in the spirit of the invention.

Figure 21A:
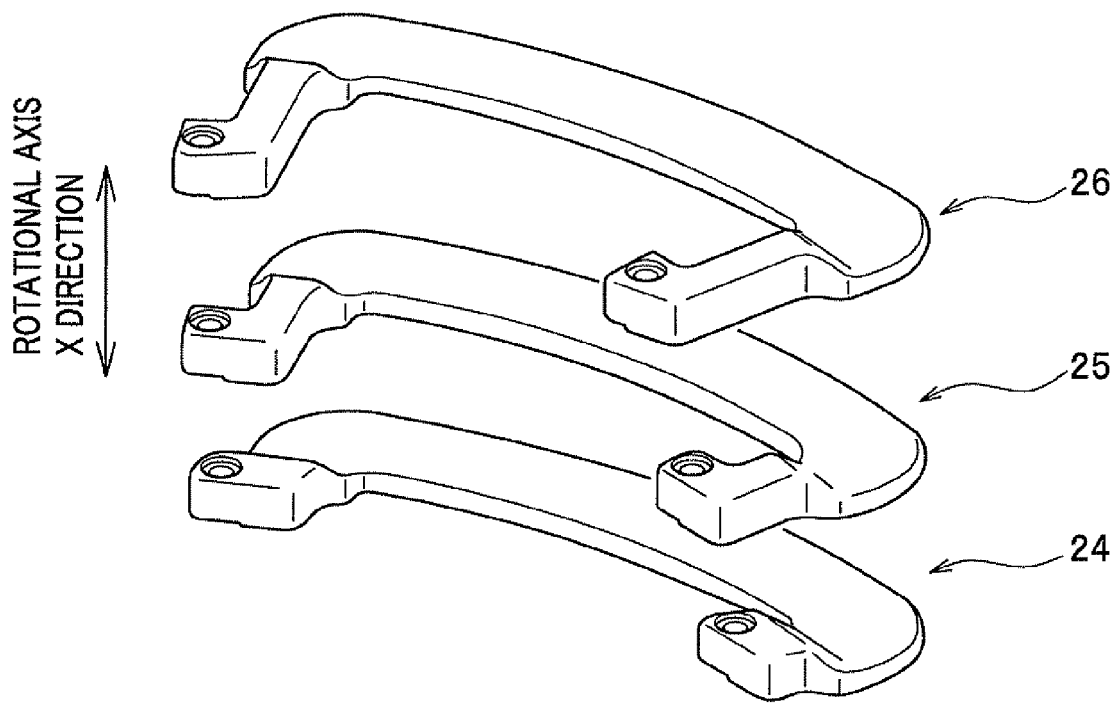
Figure 21B:
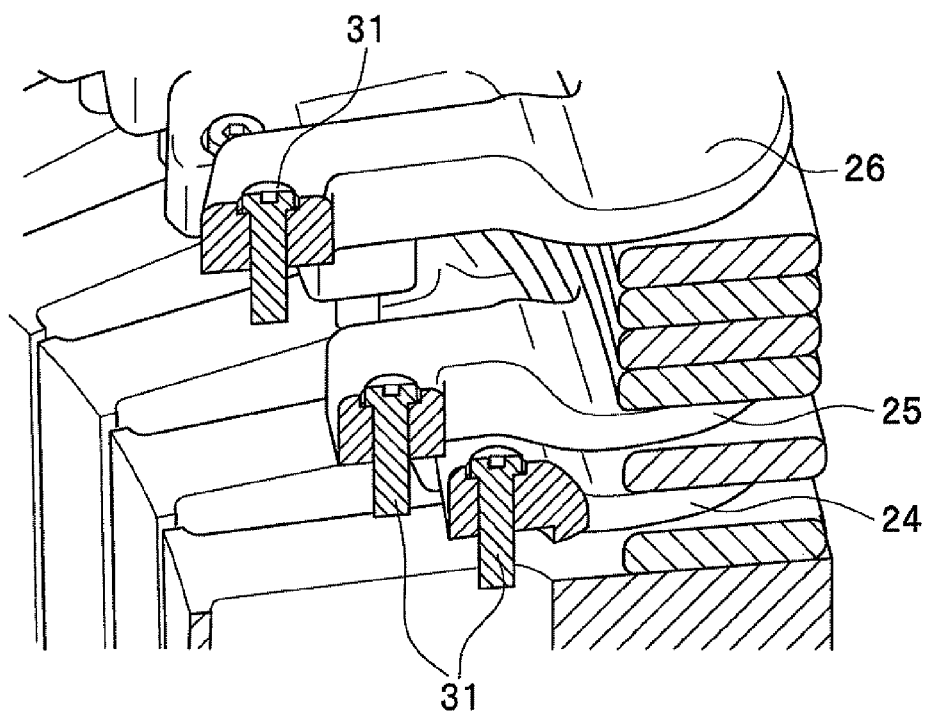

For example, for the stator 1 according to the present embodiment, the paired extended portions of coil end plates 24, 25, 26 are disposed in a circular annular state on the respective layers, on the end surface of the stator core 10, such that the lower a layer is, coil end plates with the longer paired extended portions are disposed (along the radial direction of the stator core 10) and the smaller the radius is. However, in reverse, as shown in FIGS. 21A and 21B, the paired extended portions of coil end plates 24, 25, 26 may be disposed in a circular annular state on the respective layers such that the lower a layer is, coil end plates with the shorter paired extended portions are disposed (along the radial direction of the stator core 10) and the larger the radius is. Also with such a structure, as coil end plates 24, 25, 26 are laminated in a step form, heat generated by current flow in the coil end plates 24, 25, 26 easily transfers to the stator core 10, and the cooling efficiency is thereby improved.

Figure 22:
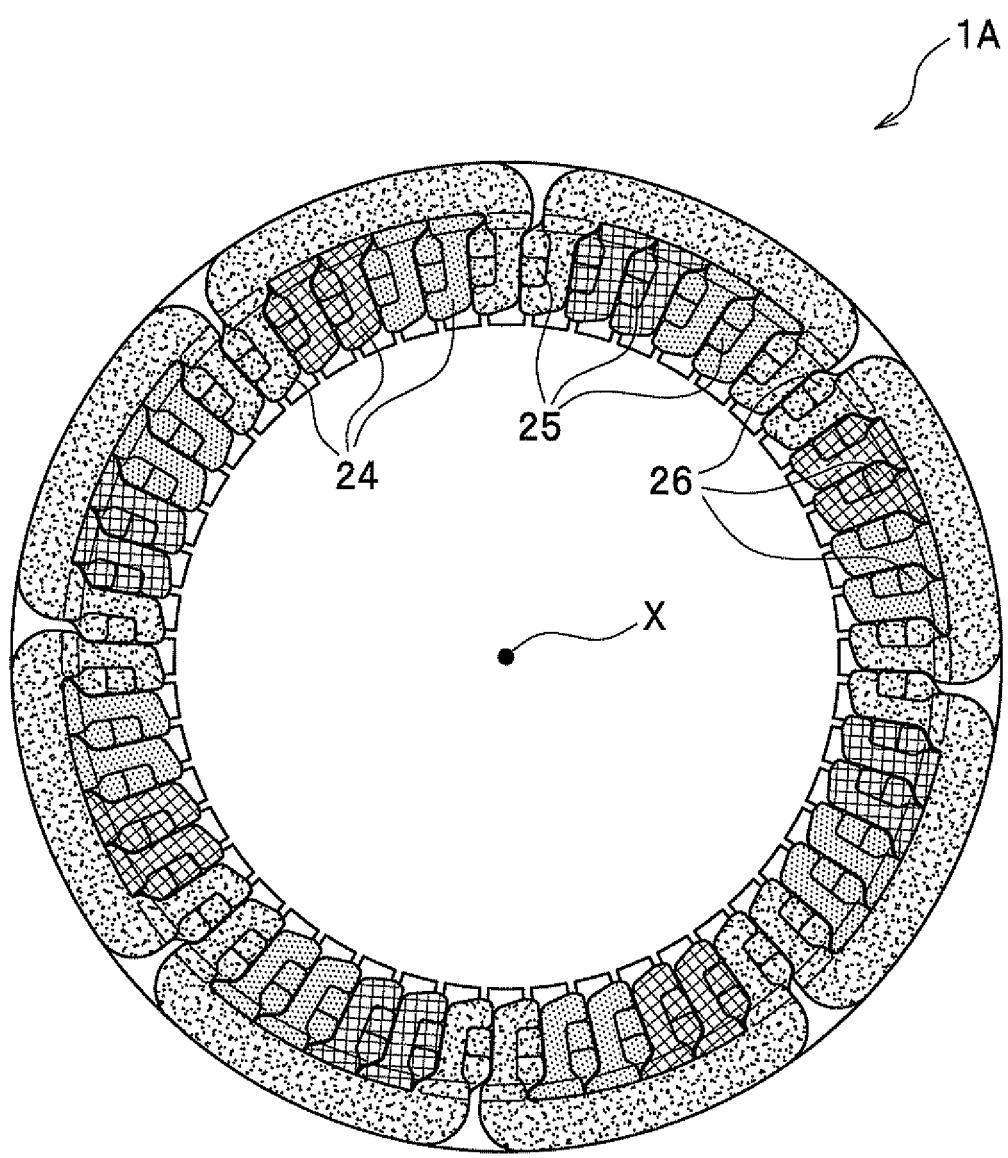
FIG. 22 is a diagram showing the whole structure of a stator for a rotary electric machine, according to another embodiment, and is a plan view in a state that the side on which coil end plates are disposed faces upward.

Further, for the stator 1 according to the present embodiment, in a state, as shown in FIG. 22, that the paired second extended portions (hole portions) of coil end plate 24, 25, 26 are exposed, the coil end plates 24, 25, 26 can be laminated on the other end surface of the stator core 10. In such a manner, the area occupation ratio of coils can be increased by the use of coil end plate 21, 22, 23. Further, the volume of the crossover portions of coils on the other end surface of the stator core 10 can be reduced by the use of coil end plate 24, 25, 26. Still further, a space for fastening by fastening members 31 or welding can be ensured in laminating the coil end plates 24, 25, 26.

Still further, for the stator 1 according to the present embodiment, although fastening members 31 have been described, as an example, as joining means between coil segments and coil end plates, the joining means is not limited thereto, and means such as crimp fitting, welding, brazing, or the like may be used.

Yet further, although the stator 1 according to the present embodiment has a structure where three coil turns are formed along the radial direction of the stator core 10, two coil turns or four coil turns, for example, may be formed. In case of forming two coil turns along the radial direction of the stator core 10, arrangement can be made such that two coil segments 21, 22, or 23 are received in a slot 11 shown in FIG. 7, and six coil end plates 24, 25, 26 are laminated on the other end surface side of the stator core 10 shown in FIG. 12. Further, in case of forming four coil turns along the radial direction of the stator core 10, arrangement can be made such that four coil segments 21, 22, 23 are received in a slot 11 shown in FIG. 7, and twelve coil end plates 24, 25, 26 are laminated on the other end surface side of the stator core 10 shown in FIG. 12.

What is claimed is:

1. A stator for a rotary electric machine, comprising:
a stator core in a cylindrical shape with a plurality of slots formed at an inner circumferential surface;
a plurality of coil segments inserted in the slots from one end surface side of the stator core; and
a plurality of coil end plates electrically connected with the coil segments on another end surface side of the stator core,
wherein the coil segments respectively include:
one leg portion received in one of the slots;
another leg portion received in one of the slots that is different from the slot for the one leg portion; and
a curved portion that is continuously formed between the one leg portion and the other leg portion and is exposed on the one end surface side of the stator core,
wherein the coil end plates respectively include:
a plate portion in a flat plate shape extended along a circumferential direction of the stator core; and
a pair of extended portions respectively extended along a radial direction of the stator core from one end side of the plate portion,
and wherein end portions of the leg portions of the coil segments are connected to the extended portions of the coil end plates;
wherein the extended portions of the respective coil end plates include:
a pair of first extended portions respectively extended along the radial direction of the stator core from the one end side of the plate portion; and
a pair of second extended portions respectively extended along the circumferential direction of the stator core from one end side of the first extended portions,
and wherein the end portions of the leg portions of the coil segments are connected to the second extended portions of the extended portions of the coil end plates.

2. The stator according to claim 1, wherein the coil segments and the coil end plates are formed with the same cross-sectional area that is perpendicular to a direction of current flow.

3. The stator according to claim 1, wherein the extended portions of the coil end plates are formed to be different in length between the coil end plates, corresponding to a number turns of a coil loop.

4. The stator according to claim 1, wherein the second extended portions of each of the coil end plates are extended from the one end side of the first extended portions in the same direction that is the circumferential direction of the stator core.

5. The stator according to claim 4,
wherein the leg portions of the coil segments are received in the slots of the stator core, in a plural number along a radial direction of the stator core, the plural number corresponding to a number of turns of a coil loop,
and wherein the closer to an outer diameter side of the stator core a leg portion is received, the larger a width of the leg portion is, corresponding to a shape of the slots.

6. The stator according to claim 1, wherein length of the one or the other leg portion is different between the coil segments, corresponding to a phase of flowing current.

7. The stator according to claim 1, wherein each of the slots of the stator core is formed such that a width of the slot increases as approaching an outer diameter side of the stator core.

8. The stator according to claim 1, wherein a thickness of the extended portions of the coil end plates is larger than a thickness of the plate portion.

9. A stator for a rotary electric machine, comprising:
a stator core in a cylindrical shape with a plurality of slots formed at an inner circumferential surface;
a plurality of coil segments inserted in the slots from one end surface side of the stator core; and
a plurality of coil end plates electrically connected with the coil segments on another end surface side of the stator core,
wherein the coil segments respectively include:
one leg portion received in one of the slots;
another leg portion received in one of the slots that is different from the slot for the one leg portion; and
a curved portion that is continuously formed between the one leg portion and the other leg portion and is exposed on the one end surface side of the stator core,
wherein the coil end plates respectively include:
a plate portion in a flat plate shape extended along a circumferential direction of the stator core; and
a pair of extended portions respectively extended along a radial direction of the stator core from one end side of the plate portion,
wherein end portions of the leg portions of the coil segments are connected to the extended portions of the coil end plates,
wherein the coil end plates are disposed in a plural number along the circumferential direction of the stator core and laminated, on the other end surface of the stator core, such that the extended portions are shifted along the radial direction of the stator core, corresponding to a layer of the lamination, and
wherein the coil end plates form virtual circles by being disposed in a circular annular form such that each of the coil end plates has no portion that overlaps with a neighboring coil end plate on the same layer,
on the lower layer a coil end plate is arranged, the longer along the radial direction of the stator core the extended portions of the coil end plate are formed,
and wherein the virtual circles are formed such that on the lower layer a virtual circle is, the smaller radius the virtual circle has.

10. The stator according to claim 9,
wherein the coil end plates form virtual circles by being disposed in a circular annular form such that each of the coil end plates has no portion that overlaps with a neighboring coil end plate on the same layer,
on the lower layer a coil end plate is arranged, the shorter along the radial direction of the stator core the extended portions of the coil end plate are formed,
and wherein the virtual circles are formed such that on the lower layer a virtual circle is, the larger radius the virtual circle has.

11. The stator according to claim 9,
wherein each pair of the extended portions includes:
a pair of first extended portions that are respectively extended along the radial direction of the stator core from the one end side of the plate portion; and
a pair of second extended portions that are respectively extended along the circumferential direction of the stator core from one end side of the first extended portions,
wherein the end portions of the leg portions of the coil segments are connected to the second extended portions of the extended portions of the coil end plates,
wherein the plate portions are disposed such as to overlap with each other at the same position, along a rotational axis direction of the rotary electric machine, correspondingly to a phase of a flowing current,
wherein the first extended portions are disposed such as to partially overlap with each other along the rotational axis direction, correspondingly to a phase of a flowing current, and wherein the second extended portions are disposed such as not to overlap with each other along the rotational axis direction.

12. A stator for a rotary electric machine, comprising:
a stator core in a cylindrical shape with a plurality of slots formed at an inner circumferential surface;
a plurality of coil segments inserted in the slots from one end surface side of the stator core; and
a plurality of coil end plates electrically connected with the coil segments on another end surface side of the stator core,
wherein the coil segments respectively include:
one leg portion received in one of the slots;
another leg portion received in one of the slots that is different from the slot for the one leg portion; and
a curved portion that is continuously formed between the one leg portion and the other leg portion and is exposed on the one end surface side of the stator core,
wherein the coil end plates respectively include:
a plate portion in a flat plate shape extended along a circumferential direction of the stator core;
a pair of first extended portions respectively extended along the radial direction of the stator core from the one end side of the plate portion;
a pair of second extended portions respectively extended along e circumferential direction of the stator core from one end side of the first extended portions, and end portions of the leg portion is of the coil segments are connected to the second extended portions of the extended portions of the coil end plates,
wherein the paired leg portions of the coil segment are received in two slots of the stator core, and respective end portions of the paired leg portions of the coil segment received in the two slots are connected with respective different coil end plates on the other end surface side of the stator core, to thereby form a circular annular current path,
wherein the current path is formed in a plural number along a radial direction of the stator core, corresponding to a number of combinations of coil segments inserted in the same slot of the stator core and corresponding coil end plates, and in a plural number along a circumferential direction of the stator core, corresponding to a number of combinations of coil segments inserted in different slots of the stator core and corresponding coil end plates,
and wherein, in current paths neighboring along the circumferential direction of the stator core out of the plural current paths formed along the radial direction and the circumferential direction of the stator core, currents flow in respective rotation directions that are reverse to each other.

13. The stator according to claim 12,
wherein the coil end plates respectively include:
a plate portion in a flat plate shape extended along a circumferential direction of the stator core; and
a pair of extended portions respectively extended along a radial direction of the stator core from one end side of the plate portion,
and wherein end portions of the leg portions of the coil segments are connected to the extended portions.

14. The stator according to claim 12, wherein the current paths are formed such as not to intersect, along the circumferential direction of the stator core, with neighboring current paths.

15. The stator according to claim 12, comprising:
a left-right reverse coil segment that is inserted into two slots from the one end surface side of the stator core, and electrically connected with two coil end plates on the other end surface side of the stator core so as to reverse a direction of a current flowing in coil segments,
wherein the left-right reverse coil segment includes:
one leg portion that is received by one of the two slots and connected with an extended portion of one of the two coil end plates;
another leg portion that is received by the other one of the two slots that is different from the slot for the one leg portion, wherein an end portion of the other leg portion is connected with an extended portion of the other one of the two coil end plates; and
a curved portion that is continuously formed between the one leg portion and the other leg portion and exposed on the one end surface side of the stator core.

16. The stator according to claim 15, comprising:
a power supply coil segment for supplying power from an external power source to the coil segments and the left-right reverse coil segment,
wherein the power supply coil segment includes:
one leg portion that is received in a slot, one end portion thereof being connected with an extended portion of a coil end plate and another end portion thereof being exposed on the one end surface side of the stator core;
another leg portion that is exposed on the one end surface side of the stator core, one end portion thereof being connected with the external power source; and
a curved portion that is exposed on the one end surface side of the stator core and connects the other end portion of the one leg portion and another end portion of the other leg portion.

17. The stator according to claim 15, comprising:
a midpoint-short-circuit coil end plate that is electrically connected, on the one end surface side of the stator core, with coil end plates each of which forms the last current path of the plural current paths in a group formed on the stator, wherein the midpoint-short-circuit coil end plate short circuits currents in plural phases supplied from outside at a midpoint; and
midpoint-connection coil segments for electrically connecting the midpoint-short-circuit coil end plate and the coil end plates,
wherein the midpoint-short-circuit coil end plate includes:
a plate portion in a flat plate shape extending along the circumferential direction of the stator core; and
extended portions that are respectively extended along the radial direction of the stator core from one end side of the plate portion, a number of the extended portions being corresponding to a number of phases of currents, one end portion of each midpoint-connection coil segment being connected to a corresponding one of the extended portions,
and wherein the midpoint-connection coil segments are received in slots, the other end portion of each midpoint-connection coil segment being connected with an extended portion of the corresponding coil end plate.

18. The stator according to claim 17, wherein the coil segments, the left-right reverse coil segments, the coil end plates, the power supply coil segments, the midpoint-short-circuit coil end plate, and the midpoint-connection coil segments are formed such as to have the same cross-sectional area perpendicular to a direction of current flow.

* * * * *